United States Patent
Nazarzadeoghaz et al.

(10) Patent No.: US 11,290,353 B2
(45) Date of Patent: Mar. 29, 2022

(54) DERIVATION OF NETWORK SERVICE DESCRIPTOR FROM NETWORK SERVICE REQUIREMENTS

(71) Applicants: Navid Nazarzadeoghaz, Montreal (CA); Maria Toeroe, Montreal (CA); Ferhat Khendek, Montreal (CA)

(72) Inventors: Navid Nazarzadeoghaz, Montreal (CA); Maria Toeroe, Montreal (CA); Ferhat Khendek, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 153 days.

(21) Appl. No.: 16/622,077

(22) PCT Filed: Mar. 8, 2018

(86) PCT No.: PCT/IB2018/051525
§ 371 (c)(1),
(2) Date: Dec. 12, 2019

(87) PCT Pub. No.: WO2018/229559
PCT Pub. Date: Dec. 20, 2018

(65) Prior Publication Data
US 2020/0186442 A1    Jun. 11, 2020

Related U.S. Application Data

(60) Provisional application No. 62/520,744, filed on Jun. 16, 2017.

(51) Int. Cl.
*H04L 12/24* (2006.01)
*H04L 41/5041* (2022.01)
*H04L 41/14* (2022.01)

(52) U.S. Cl.
CPC .......... *H04L 41/5045* (2013.01); *H04L 41/14* (2013.01); *H04L 41/5048* (2013.01)

(58) Field of Classification Search
CPC .. H04L 41/14; H04L 41/5045; H04L 41/5048
See application file for complete search history.

(56) References Cited

U.S. PATENT DOCUMENTS 10,999,219 B1 * 5/2021 Athreyapurapu ... H04L 12/4641
2016/0212017 A1 * 7/2016 Li ........................... H04L 41/12
(Continued)

OTHER PUBLICATIONS

Sadaf Mustafiz et. al.: "A Model-Driven Process Enactment Approach for Network Service Design"; Sep. 2017; 20 pages.
(Continued)

*Primary Examiner* — Hitesh Patel
(74) *Attorney, Agent, or Firm* — Julie Dufort; Ericsson Canada Inc.

(57) ABSTRACT

A Network Service Descriptor (NSD) is generated, from Virtualized Network Functions (VNFs) existing in a VNF catalog, for instantiating a network service which satisfies given network service requirements. From the VNF catalog, a system selects VNFs that provide functionalities and architectural blocks required to fulfill the NS requirements. The system generates at least a VNF forwarding graph (VNFFG), which includes relations between the functionalities and the architectural blocks of the selected VNFs as well as traffic flows between the selected VNFs. The system then creates the NSD, which includes the VNFFG, for instantiating the network service.

14 Claims, 18 Drawing Sheets

(56) References Cited

U.S. PATENT DOCUMENTS

| | | | | |
|---|---|---|---|---|
| 2016/0337172 | A1* | 11/2016 | Yu | H04L 67/34 |
| 2017/0142591 | A1* | 5/2017 | Vrzic | H04L 47/2408 |
| 2017/0272523 | A1* | 9/2017 | Cillis | H04L 41/5048 |
| 2018/0004576 | A1* | 1/2018 | Gokurakuji | G06F 9/46 |
| 2018/0024852 | A1* | 1/2018 | Yabushita | G06F 9/46 718/1 |
| 2018/0121227 | A1* | 5/2018 | Peng | H04L 41/5054 |
| 2019/0028350 | A1* | 1/2019 | Yeung | H04L 41/0893 |
| 2019/0065234 | A1* | 2/2019 | Zembutsu | H04L 47/82 |
| 2021/0194749 | A1* | 6/2021 | Toeroe | H04L 41/5045 |

OTHER PUBLICATIONS

Sadaf Mustafiz et. al.:"A Network Service Design and Deployment Process for NFV Systems"; Oct. 2016; 9 pages.

Mahin Abbasipour et al.: "Ontology-based User Requirements Decomposition for Component Selection for Highly Available Systems" Aug. 2014; 8 pages.

ETSI GS NFV-IFA 014, V2.1.1: Network Functions Virtualisation (NFV); Management and Orchestration; Network Service Templates Specification; Oct. 2016; 35 pages.

ETSI GS NFV-IFA 014, V2.3.1: Network Functions Virtualisation (NFV) Release 2; Management and Orchestration; Network Service Templates Specification; Aug. 2017; 36 pages.

ETSI GR NFV-IFA 015, V2.3.1: "Network Functions Virtualisation (NFV) Release 2; Management and Orchestration Report on NFV Information Model"; Aug. 2017; 14 pages.

ETSI GS NFV-IFA 011, V2.3.1: "Network Functions Virtualisation (NFV) Release 2; Management and Orchestration; VNF Packaging Specification"; Aug. 2017; 56 pages.

Abbasipour, M. et al.: "A Model-Based Approach for User Requirements Decomposition and Component Selection". In: Bouabana-Tebibel, T., Rubin, H.S. (eds.) Formalisms for Reuse and Systems Integration, pp. 173-202. Springer International Publishing (2015).

Sahhaf, S. et al.: "Network Service Chaining with Efficient Network Function Mapping Based on Service Decompositions". In: 1st IEEE Conference on Network Softwarization (NetSoft). pp. 1-5 (Apr. 2015).

Chung, L. et al.: "Requirements elicitation through model-driven evaluation of software components". In: Commercial-off-the-Shelf (COTS)-Based Software Systems, 2006. Fifth International Conference on. pp. 10-pp. IEEE (2006).

Czarnecki, K. et al.: "Staged configuration through specialization and multilevel configuration of feature models". Software Process: Improvement and Practice 10(2), 143-169 (2005).

Bartsch, C. et al.: "Decomposition of IT service processes and alternative service identification using ontologies". In: NOMS 2008-2008 IEEE Network Operations and Management Symposium, pp. 714-717 (Apr. 2008).

Oster, Z.J. et al.: "Decomposing the service composition problem". In: 2010 Eighth IEEE European Conference on Web Services, pp. 163-170 (Dec. 2010).

Oster, Z.J. et al.: "Identifying optimal composite services by decomposing the service composition problem". In: Proceedings of the 2011 IEEE International Conference on Web Services, pp. 267-274. ICWS '11, IEEE Computer Society, Washington, DC, USA (2011).

Lin, J. et al.:"A requirement ontology for engineering design". Concurrent Engineering 4(3), 279-291 (1996).

Bari, M.F. et al.: "On Orchestrating Virtual Network Functions". In: Proceedings of the 2015 11th International Conference on Network and Service Management (CNSM). pp. 50-56. CNSM '15, IEEE Computer Society, Washington, DC, USA (2015).

Ghaznavi, M. et al.: "Elastic Virtual Network Function Placement". In: IEEE 4th International Conference on Cloud Networking (CloudNet). pp. 255-260 (Oct. 2015).

Oracle Communications Network Service Orchestration Solution Implementation Guide, Release 1.1. White Paper (Jul. 2016).

* cited by examiner

DERIVATION OF NETWORK SERVICE DESCRIPTOR FROM NETWORK SERVICE REQUIREMENTS

This application is a 35 U.S.C. § 371 national phase filing of International Application No. PCT/IB2018/051525, filed Mar. 8, 2018, which claims the benefit of U.S. Provisional Application No. 62/520,744, filed Jun. 16, 2017, the disclosures of which are incorporated herein by reference in their entireties.

TECHNICAL FIELD

Embodiments of the disclosure relate generally to systems and methods for network service design.

BACKGROUND

Network Function Virtualization (NFV) is a new paradigm in the telecom and networks domain, which by utilizing virtualization techniques in cloud and software-defined network (SDN) enables the decoupling of software (applications) from the underlying hardware. By using general-purpose hardware infrastructure and network functions implemented, packaged and deployed as software (i.e. Virtualized Network Functions (VNFs)), the NFV architecture can provide the network service provisioning, management, and orchestration functions more efficiently, with lower capital expenditure (CAPEX) and operating expense (OPEX).

The European Telecommunication Standard Institute (ETSI) is in charge of standardizing a complete framework for NFV. The framework consists of the management and orchestration (NFV-MANO) and virtualized infrastructure running the VNFs. The Operation and Business Support System (OSS/BSS) is the business brain of service providers' framework. The OSS/BSS relies on the NFV-MANO for the deployment and management of network services in the virtualized infrastructure. The NFV-MANO deploys and manages network services based on a network service deployment template, the NS Descriptor (NSD).

An NSD is created for the deployment of network services in an NFV system. However, an NSD has a complex data structure that manual creation of an NSD is error prone and can cover only a very limited number of solutions.

SUMMARY

In one embodiment, there is provided a method for generating, from VNFs existing in a VNF catalog, an NSD for instantiating a network service which satisfies given network service requirements. The method comprises: selecting, from the VNF catalog, VNFs that provide functionalities and architectural blocks required to fulfill the network service requirements; generating at least a VNF forwarding graph (VNFFG), which includes relations between the functionalities and the architectural blocks of the selected VNFs as well as traffic flows between the selected VNFs; and creating the NSD, the NSD including the VNFFG, for instantiating the network service.

In another embodiment, there is provided a network node comprising processing circuitry and memory. The memory stores instructions executable by the processing circuitry to generate, from VNFs existing in a VNF catalog, an NSD for instantiating a network service which satisfies given network service requirements. The network node is operative to: select, from the VNF catalog, VNFs that provide functionalities and architectural blocks required to fulfill the network service requirements; generate at least a VNFFG, which includes relations between the functionalities and the architectural blocks of the selected VNFs as well as traffic flows between the selected VNFs; and create the NSD, the NSD including the VNFFG, for instantiating the network service.

In yet another embodiment, there is provided a network node operable to generate, from VNFs existing in a VNF catalog, an NSD for instantiating a network service which satisfies given network service requirements. The network node comprises: a VNF selecting module adapted to select, from a VNF catalog, VNFs that provide functionalities and architectural blocks required to fulfill given network service requirements; a graph generating module adapted to generate at least a VNFFG, which includes relations between the functionalities and the architectural blocks of the selected VNFs as well as traffic flows between the selected VNFs; and an NSD creating module adapted to create an NSD, the NSD including the VNFFG, for instantiating the network service.

In yet another embodiment there is provided a method for generating, from VNFs existing in a VNF catalog, an NSD for instantiating a network service which satisfies given network service requirements. The method comprises initiating an instantiation of a server instance in a cloud computing environment which provides processing circuitry and memory for running the server instance. The server instance is operative to: select, from the VNF catalog, VNFs that provide functionalities and architectural blocks required to fulfill the network service requirements; generate at least a VNFFG, which includes relations between the functionalities and the architectural blocks of the selected VNFs as well as traffic flows between the selected VNFs; and create the NSD, the NSD including the VNFFG, for instantiating the network service.

Other aspects and features will become apparent to those ordinarily skilled in the art upon review of the following description of specific embodiments in conjunction with the accompanying figures.

BRIEF DESCRIPTION OF THE DRAWINGS

Embodiments will now be described, by way of example only, with reference to the attached figures.

DETAILED DESCRIPTION

Figure 1:
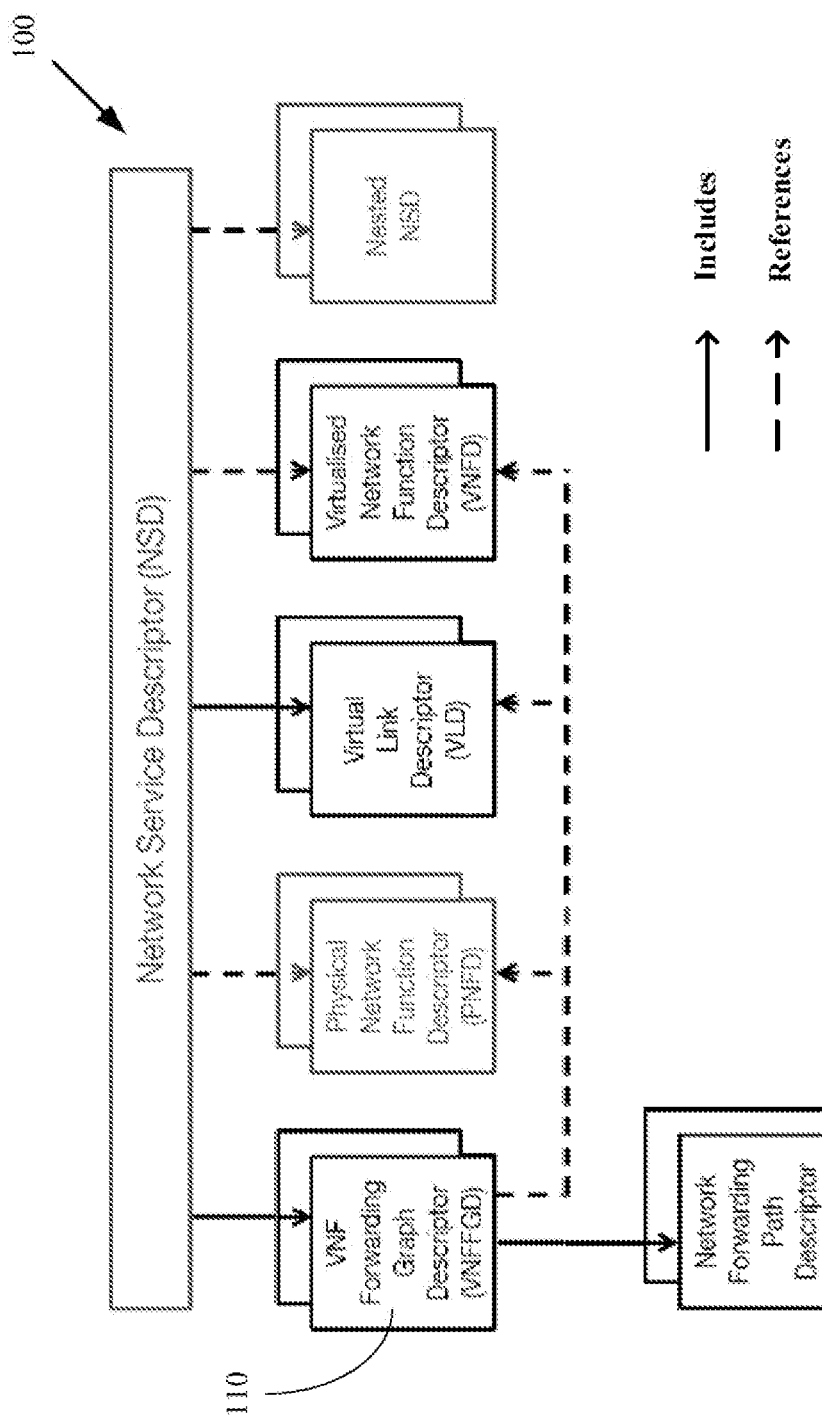
FIG. 1 illustrates an example of an NSD.

Reference may be made below to specific elements, numbered in accordance with the attached figures. The discussion below should be taken to be exemplary in nature, and should not be considered as limited by the implementation details described below, which as one skilled in the art will appreciate, can be modified by replacing elements with equivalent functional elements.

A model-driven approach is presented for designing network services and generating the deployment template, i.e. the NSDs. The network service design and NSD generation is based on the network service requirements (NSReq) of the tenants of NFV systems. Typically, a tenant's knowledge of network services is limited; insufficient for designing the NSD necessary for the deployment of the network service in the NFV system. To fill the gap, the approach uses a knowledge base, referred to as Network Function (NF) Ontology, consisting of valid decompositions of network services and their architectures. The NF Ontology is enriched based on standards of new telecom network services, and also based on successful decomposition of previous network service requirements. The NF Ontology enables the design of network services starting from their requirements; selecting appropriate VNFs if available in the VNF Catalog of the system; and defining the graph interconnecting these VNFs for their communication.

NFV Concepts and Terminology. A network service (NS) is a composition of NFs interconnected with one or more forwarding graphs (FGs). For instance, Voice over IP (VoIP), which is a voice call service, is an NS composed of NFs such as voice call server, authentication and registration servers, etc. ETSI defines the NF FG as a graph of logical links connecting NF nodes for the purpose of describing traffic flow between these network functions, i.e. the end-to-end sequence of NFs that packets traverse.

VNFs are the building blocks of an NS in NFV. VNFs are pieces of software with the same functionality as their corresponding physical network functions, e.g., a virtual firewall (vFW) vs. a traditional firewall device. A VNF is also described as a deployment template called the VNF Descriptor (VNFD). A VNF can be composed of components (VNFCs). The deployment and operational behavior of a VNFC is described in a Virtual Deployment Unit (VDU). Virtual links (VLs) are used to connect VNF instances to form a network topology. Such VL instances are referred to as external VLs, whereas internal VLs are the links which connect VNFC instances within a VNF instance.

A Connection Point (CP) is the port that an NF exposes to connect to another NF component via VLs; CPs are similar to the ports in a physical network module, such as a switch. The connection point for an NS towards the environment is the Service Access Point (SAP). As in case of the NF Forwarding Graph, the VNF Forwarding Graph (VNFFG) is the graph of interconnections of VNFs in an NS. Every VNFFG is associated with one or more pool of connection points (CpPool) referring to one or more CPs of VNFs or one or more SAPs. A sequence of connection points within a VNFFG is referred to as a Network Forwarding Path (NFP). An NFP is used to define different routing policies.

The NSD consists of information used by the NFV Orchestrator (NFVO) for lifecycle management of an NS. Catalogs have been defined in the NFV architecture and they are part of the NFV data repositories. The NS Catalog contains all the on-boarded NSDs, VNFFGDs, and VLDs. The VNF Catalog contains all the on-boarded VNFDs. In this disclosure, the artifacts are all considered to be models (instances which conform to existing meta-models).

One main functional module in the NFV architecture is the NFV-MANO, which is in charge of the deployment, management, and orchestration of NSs. The NFV-MANO consists of three functional blocks: the NFV Orchestrator (NFVO), the VNF Manager (VNFM), and the Virtualized Infrastructure Manager (VIM). The main responsibilities of NFVO include the NS orchestration and lifecycle management which involves onboarding and instantiation of NS and VNFs and NS policy management.

The Operations Support Systems and Business Support Systems (OSS/BSS) is the operator's proprietary systems and management applications supporting their business. The OSS/BSS systems interacts with the NFVO to provide the desired network services.

FIG. 1 illustrates an example of an NSD 100 including one or more VNFFG descriptors (VNFFGDs) 110 according to one embodiment. The NSD 100 is the template used for NS deployment. The elements of the NS have their own descriptors including VNFDs, VLDs, SAPDs, VNFFGDs 110, etc. (where the ending D is an abbreviation of the word "descriptor"), which accordingly are part of the NSD 100. This disclosure describes an approach for building an NS from the VNFs existing in the VNF Catalog that satisfies the requirements specified by a tenant, and generating the respective NSD and its constituents. The vendors who provide the VNFs also provide the VNFDs and any other information necessary describing their VNFs.

Figure 2:
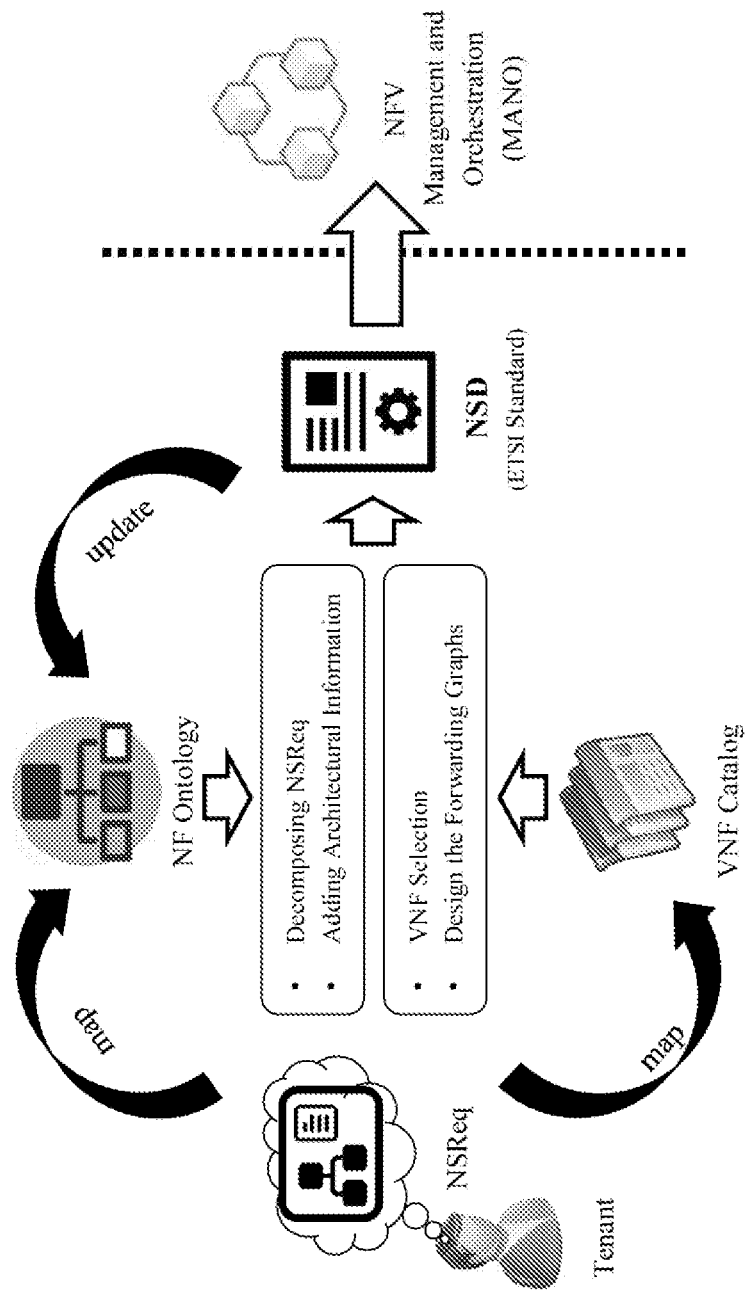
FIG. 2 illustrates an overview of a network service design process according to one embodiment.

As shown in FIG. 2, the NS design starts with receiving a set of network service requirements (NSReq) describing what a tenant requested. The tenant may specify functional and non-functional requirements (FRs and NFRs, respectively), as well as FR decompositions and architectural requirements (ARs). The tenant can easily express its needs through an NSReq, but the NSReq may not map to or contain all the necessary information for generating the NSD to deploy the NS. To bridge the gap, the NS design method first maps the NSReq onto the NF Ontology, which is a knowledge base containing, among others, the known functionalities with their known decompositions and the related architectural blocks (ABs). The mapping is done to find valid functional decomposition(s) for the requested NS that can be mapped to VNFs of the VNF Catalog. In the process the ARs are also observed and information missing from the NSReq is captured from the NF Ontology, such as functionalities and functional decompositions, ABs and architectural decompositions. Note that the NSReq may express only FRs, or only ARs, or their combination.

Once the NSReq is decomposed to the level of functionalities offered by VNFs in the Catalog, the set of VNFs that may satisfy the NSReq can be selected. The selection takes into account in addition to the functionalities also the ABs that were added from the NF Ontology based on the ARs. Depending on the contents of the VNF Catalog, multiple VNFs may fulfill a functionality and/or an AR of the NS requirements. Each valid combination of these VNFs may provide a valid option for generating an NSD. Note that the VNFs may map to functionalities at different levels of the functional decomposition, which needs to be considered at identifying a valid combination, i.e. a candidate set. All the combinations of different functional decompositions at different levels are taken into account.

Based on the different relations between the functionalities and architectural blocks, the VNFs of each candidate set can be arranged into a graph, which is the basis for generating the VNFFG step by step.

To generate the VNFFG first, the flow among the functionalities is generated for each candidate set, which is called a functional forwarding graph (FFG). Then based on each of the functional flows, the AB flows, which are captured in the architectural forwarding graphs (AFGs), are generated. There is combinatorial aspects of ABs as well. Combining different architectural compositions may be appropriate and each of them can be an option for generating the flow between the VNFs. Based on each of the AB flows, a corresponding flow is generated between the VNFs for each of the VNFs implementing the ABs, which is referred to as a Pre-VNFFG. The VNF flows at this step are not complete VNFFGs yet, because the VLs are not generated yet.

For each of the Pre-VNFFGs, an NSD is generated which includes the VNFDs, VLDs, SAPDs and VNFFGDs. This NSD may be considered partial because it only takes into account the FRs and ARs; elements of the NSD such as deployment flavors and profiles are still missing, which are related to NFRs (e.g. traffic volume).

If the NSD generation was successful and it was not part of the NF Ontology yet, i.e. it is a new decomposition, then it is added to the NF Ontology.

A generated NSD defines an NS and can be passed to the NFV-MANO for onboarding. Such an NS can be instantiated with different instantiation parameters. Alternatively, the NSD could be further tailored to take into account the NFRs.

The NS design method can be implemented as a set of model transformations. The following is a description of the meta-models used in the NS design method. The meta-models are shown in Unified Modeling Language (UML) class diagrams.

Figure 3:
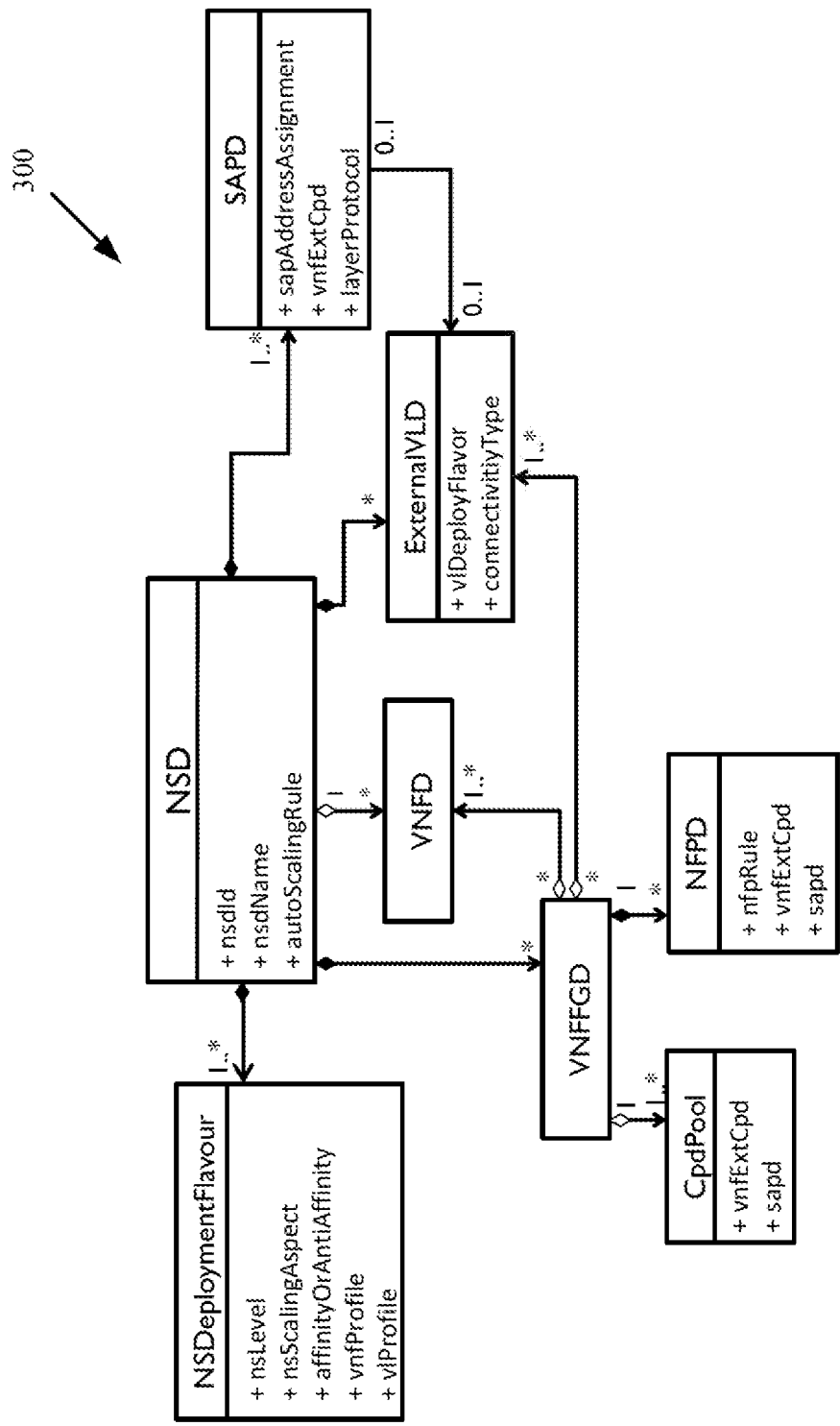
FIG. 3 illustrates an NSD meta-model defined by ETSI NFV.

FIG. 3 illustrates an NSD meta-model 300 defined by ETSI NFV. An NSD model instance describes an NS for the NFV-MANO to deploy the NS. Instances of the NSD meta-model 300 are the output of the NS design method.

The VNF Descriptor (VNFD) element is a main constituent of a NSD, as the VNFs are primary elements for forming an NS. Along with the VNFD, for all of the other elements of the NS, there are descriptors in the NSD including external VLD, SAPD, VNFFGD, and also CPD Pool and NFPD which are constituents of VNFFGD.

In addition, there are other information elements in the NSD regarding capacity and other non-functional characteristics of the NS, similar to the VNFD. These elements are network service deployment flavors which consist of information such as affinity/anti-affinity rules for the elements of NS, the possible range of the number of instances of VNFs, scaling information and so on.

Figure 4:
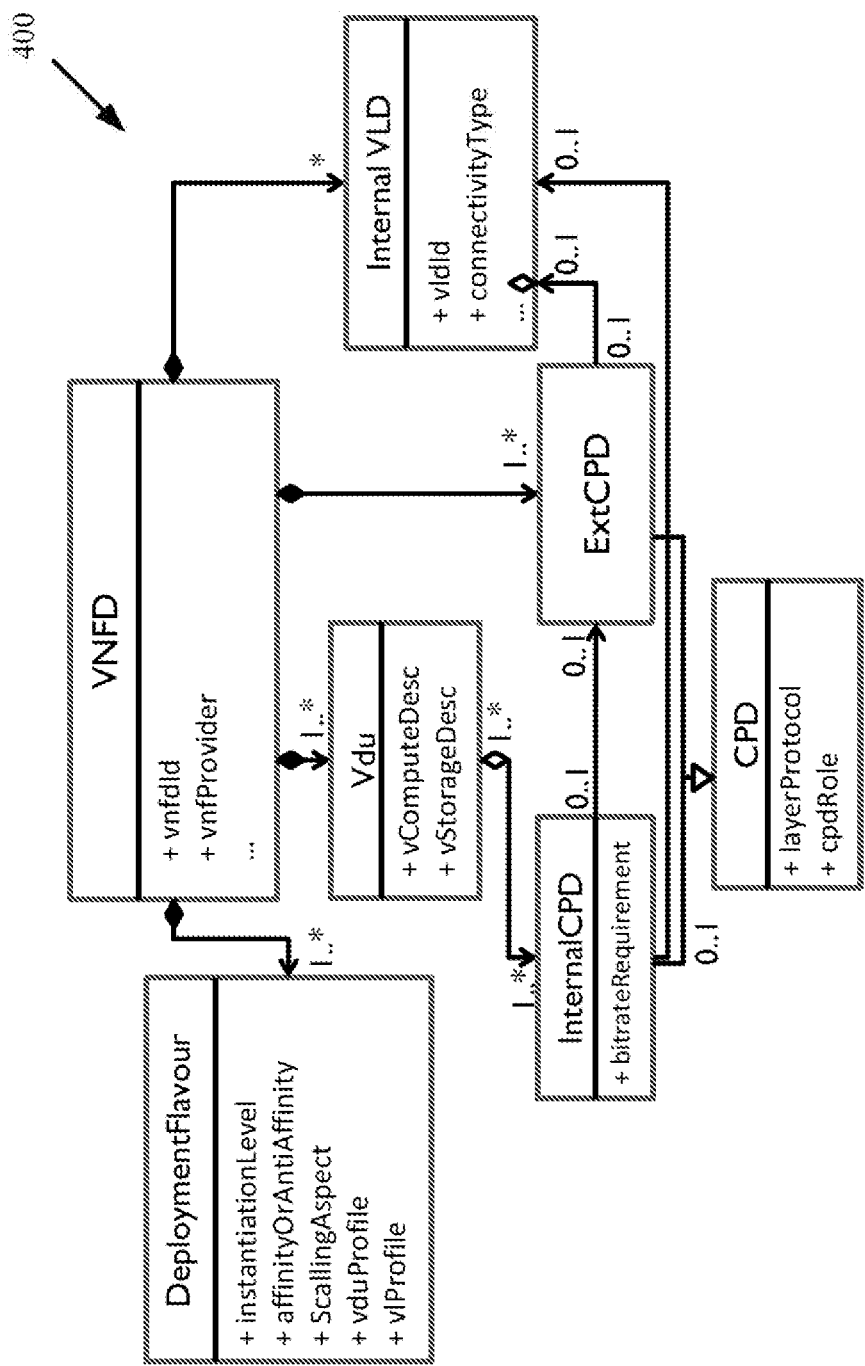
FIG. 4 illustrates a simplified VNF descriptor (VNFD) meta-model defined by ETSI NFV.

FIG. 4 illustrates a VNF Descriptor (VNFD) meta-model 400 defined by ETSI NFV. A VNFD is a model describing the characteristics of a VNF from the perspective of its management and orchestration within the NFV framework.

A VNF is composed, among others, of VNF Components (VNFC), internal virtual links (VL). Accordingly, the VNFD is composed of their descriptors. A VNFC is described by a virtual deployment unit (Vdu) element. It describes the deployment characteristics of a VNFC instance such as required central processing units (CPUs), random access memory (RAM) and storage. The Vdu contains a descriptor element for the internal connection points (CPD) and another for external CPDs. A VLD element has been defined for the descriptor of internal VL.

The VNFD may include elements describing non-functional characteristics, such as the capacity of the VNF and its components, a range for the number of instances of different VNFCs (instantiation level) and so on.

The existing standard VNFD, as shown in FIG. 4, provides no information about the functionalities of the VNF and its VNFCs, the interfaces provided by the connection points to access these functionalities.

Figure 5:
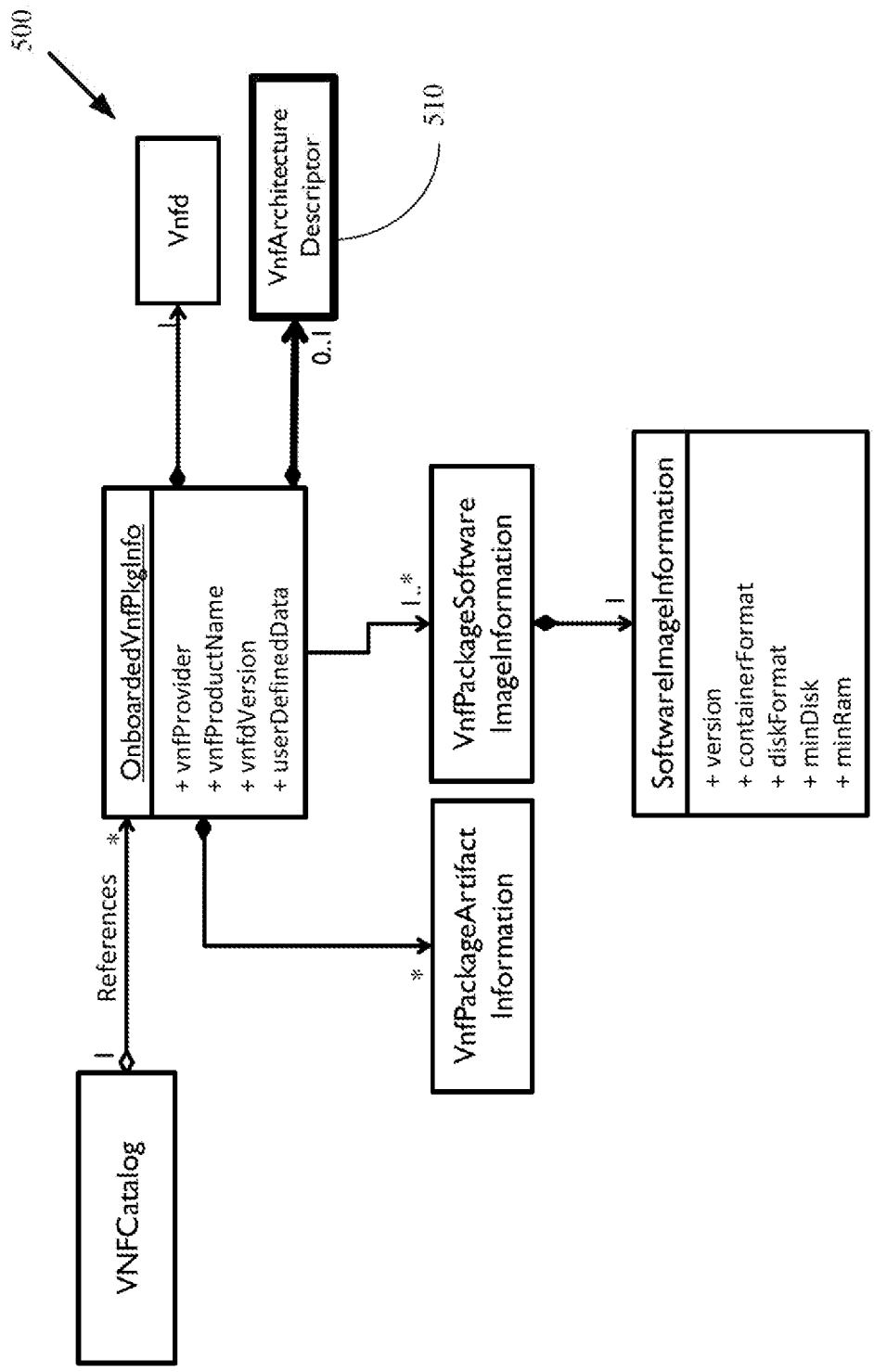
FIG. 5 illustrates a VNF catalog meta-model according to one embodiment.

FIG. 5 is a VNF Catalog meta-model 500 according to one embodiment. The VNF Catalog meta-model 500 has been extended with a new element, the VNF architecture descriptor element 510, which is outlined in bold in FIG. 5. The model describing a VNF Package has been defined by ETSI NFV as onboarded VNF package info (OnboardedVnfPfgInfo), which is used by NFV-MANO. The OnboardedVnfPfgInfo includes the VNFD, the VNF package software image information, and VNF package artifact info. Each time a VNF is onboarded, an instance of the OnboardedVnfPfgInfo is created and added to the VNF Catalog.

Figure 6:
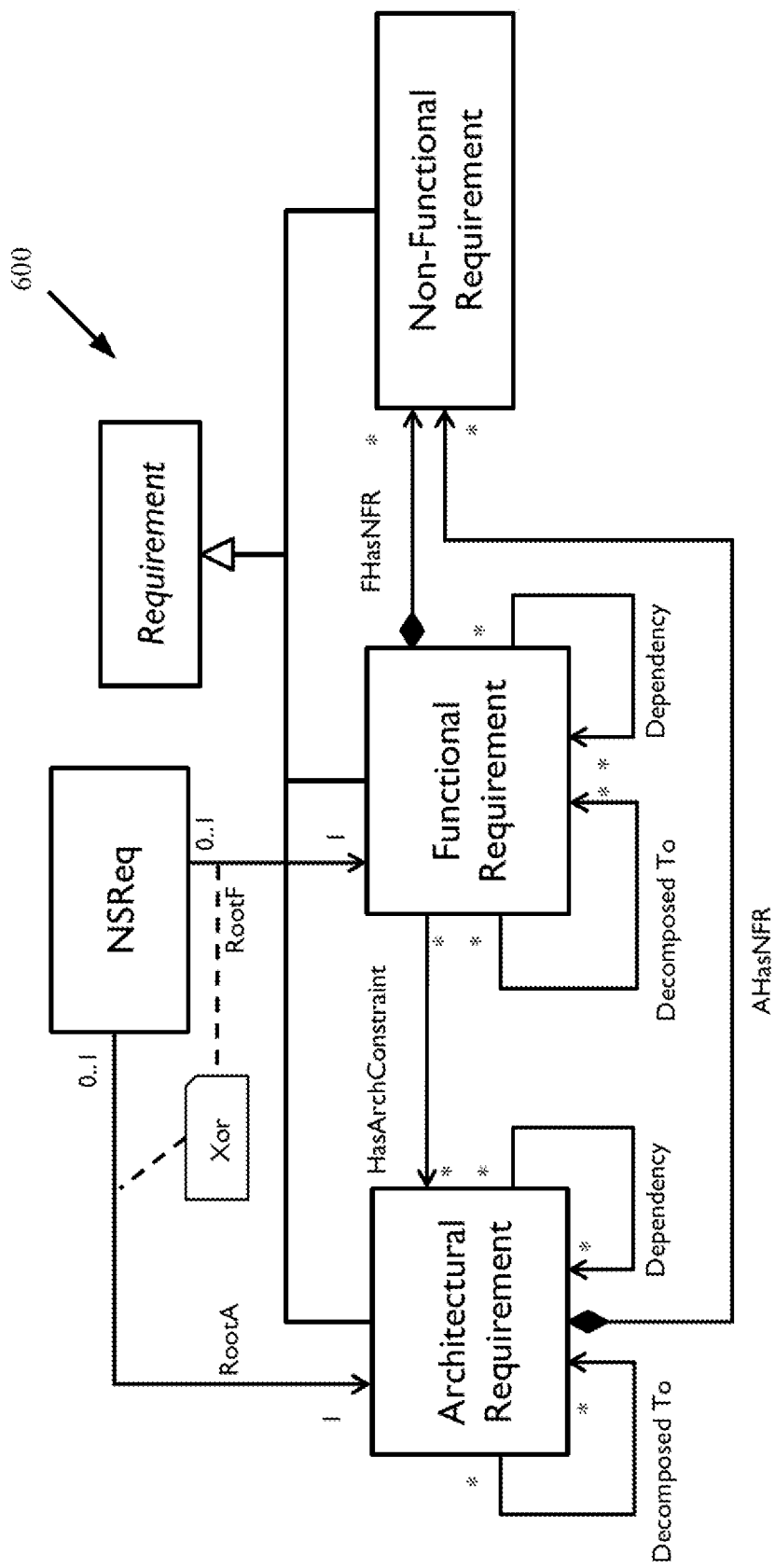
FIG. 6 illustrates a network service requirements (NSReq) meta-model according to one embodiment

FIG. 6 illustrates an NSReq meta-model 600 according to one embodiment. An instance of the NSReq meta-model 600 describes the tenant's requirements for an NS to be provided. The main element in the NSReq meta-model 600 is the requirement. There are three types of requirements: functional, architectural and non-functional.

Each FR represents a required functionality to be a part of the NS. Each FR has at least a name. An FR can have a decomposition into other FRs, meaning that the tenant requires a certain (de)composition. As a result, the structure of FRs in the NSReq is hierarchical. In addition, an FR can have dependency relations with other FRs, which means that the dependent FR will be executed after the FRs it depends on. Thus, a dependency between FRs of the NSReq implies a flow, which is used as a constraint in the NS design.

The tenant may request specific architectural realization of functionalities. This is expressed by an AR. An AR may or may not be associated with FRs. For example, the tenant may request a VoIP (voice over internet protocol) network service realized by Internet Protocol Multimedia Subsystem (IMS) architecture. An AR also has a name, and it may have decomposition and dependency relations.

Typically, ARs are expressed as constraints for the FRs, as an AB may realize multiple functionalities and the same functionality may be realized by different ABs. However, the NSReq may also be expressed as an AR only hierarchy with no FR. In such a case, it is assumed that the architecture with all its functionalities is requested.

From the perspective of functionalities, an NSReq consists of a single root functionality, which may be decomposed to lower level functionalities. The same applies from a pure architectural perspective. When both present, the ABs are associated with the functionalities, and the functionalities take precedence, i.e. at the root there will be an FR. This is expressed in the meta-model through the XOR relation of the associations between the NSReq root element to FR (RootF) and the NSReq root element to AR (RootA). The NSReq root element itself may consist of attributes such as author, date, version, etc.

The last element in the NSReq meta-model 600 is the non-functional requirement (NFR). It expresses the required non-functional characteristics such as throughput or latency. An NFR may be attached to an FR or AR, which means that the functionality or the architecture is requested with the associate non-functional characteristic. Details of the NFRs are beyond the scope of this disclosure.

Figure 7:
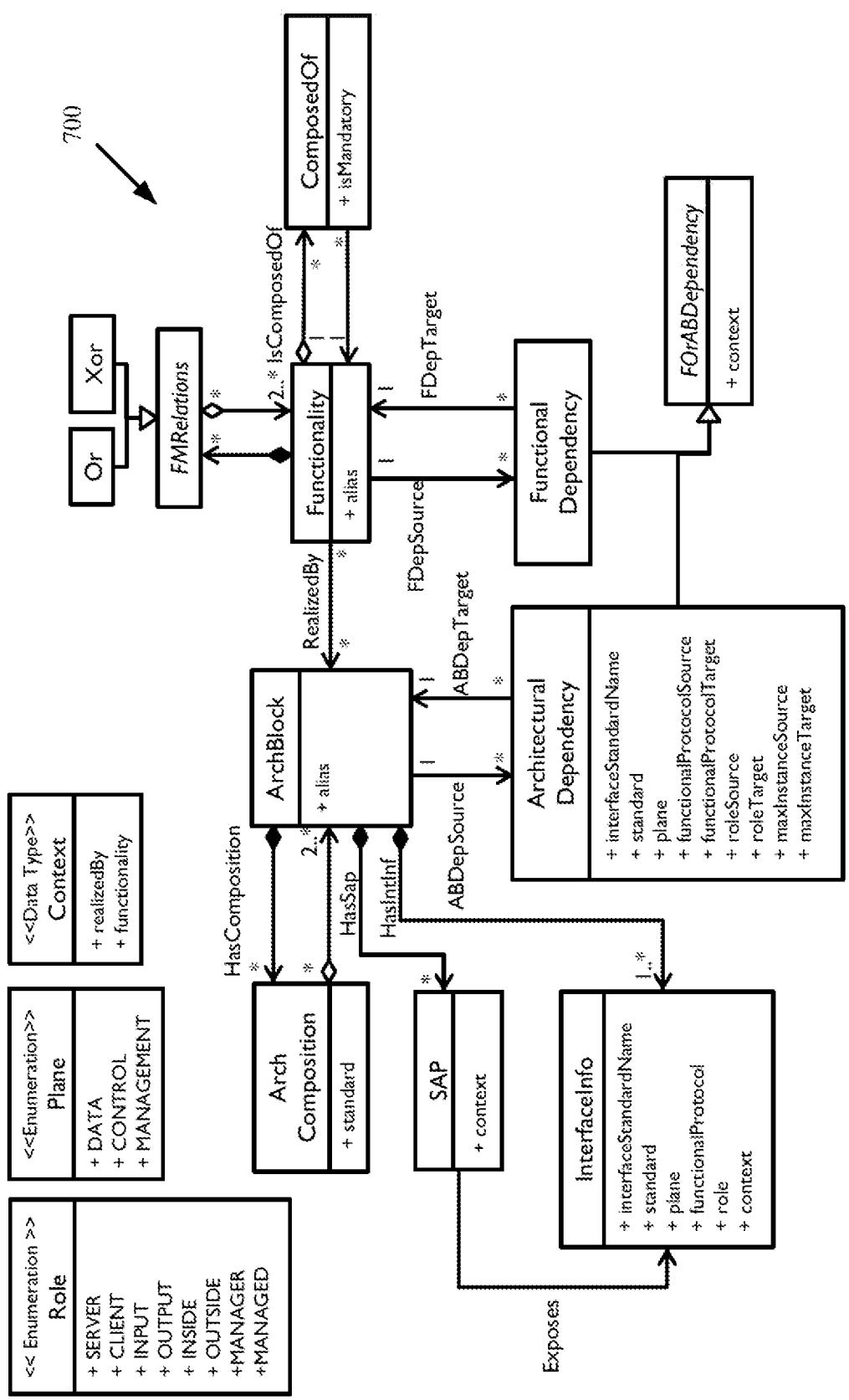
FIG. 7 illustrates a Network Functions (NF) Ontology meta-model according to one embodiment.

FIG. 7 illustrates an NF Ontology meta-model 700 according to one embodiment. The NF Ontology meta-model 700 enables the modeling of complete NS designs. The NF Ontology meta-model 700 has two main elements: functionality and AB (i.e. architectural block).

A functionality has a name, and may have aliases and different relations. A functionality may have a functional decomposition into lower level functionalities, which may be optional or mandatory. So, a functionality may have a core decomposition, all of which is mandatory. If any part of this core is requested in the NSReq the entire core needs to be part of the NS design. Optional functionalities of the decomposition can be selected or not depending on the functional requirements in the NSReq. Functionalities in a given decomposition may have an OR or an XOR (exclusive OR) relation with one another. From functionalities in OR relation, one or more can be selected at the same time; while from those in XOR relation only one can be selected.

A functionality may have a functional dependency in the context of the parent functionality. This means that this functional dependency exists only if the client (dependent) and the supplier (sponsor) functionalities are the children (decomposition) of the functionality indicated as context. Different functionalities may decompose into common lower-level functionalities, and the functional dependencies of these common lower-lever functionalities may exist only for decompositions of some higher level functionalities a.k.a. context, but not for others.

A functionality is realized by an AB reflected in the meta-model 700 by the AB element. In the telecom domain architectures are often based on standards. For instance, 3GPP defined the IMS architecture, which provides functionalities such as registration and authentication. The Proxy Call Session Control Function (P-CSCF) is one of the ABs which IMS is composed of.

An AB has a name and at least one interface. An AB may also have aliases and relations: architectural dependency and architectural composition.

An AB may have different interfaces towards other ABs. This information, captured in an interface info element of the NF Ontology meta-model 700, is useful for the NS design and in particular for the design of FGs. The interface info describes the protocol used on the interface at the application/functionality level and the related role(s), for instance, being an output or input. The roles, depending on the domain, may include input/output, server/client, inside/outside, manager/managed. In addition, the interface info may also define the plane it is used, e.g. data or control plane and refer to a standard defining it. In this latter case it has a standard name. For instance, the Mw interface of P/I/S-CSCF ABs of IMS is defined by 3GPP.

Some of the interfaces of an AB may be used as a service access point (SAP) of that architecture. As a result, an SAP element is associated with an interface info element.

The concept of decomposition of an AB into lower-level ABs exists as an architectural composition element. An AB can have different decompositions (i.e. different architectural compositions). An architectural composition has at least two lower-level ABs. An architectural composition may provide the name of a standard it is based on.

An architectural dependency implies a communication between the ABs involved. Therefore, the architectural dependency element provides the characteristics of the interfaces used for this communication. As a result, the architectural dependency specializes some of the attributes of the interface info element for the client (source) and the supplier (target) ABs. In addition, a minimum and a maximum number of AB instances in a dependency relation can be specified.

Architectural dependencies and SAP elements may also be applicable only in a given context. If there is no context, it means they exist in the NS whenever their client and supplier ABs exist. In case of a context, they only exist in an NS when the context exists, i.e., if their AB does not provide the context functionality, they do not exit. For example, I-CSCF has a SAP in the context of functionality X. This SAP becomes part of the NS design only when I-CSCF is required to provide functionality X, but not when it provides only functionality Y.

As it has been shown in FIG. 5, the VNF catalog meta-model 500 includes the onboarded VNF package info, which is extended with an element 510 describing the VNF architecture. This element defines information which goes beyond the current tasks of the NFV framework, hence not covered by the ETSI NFV specifications, but it is needed for the NS design.

Figure 8:
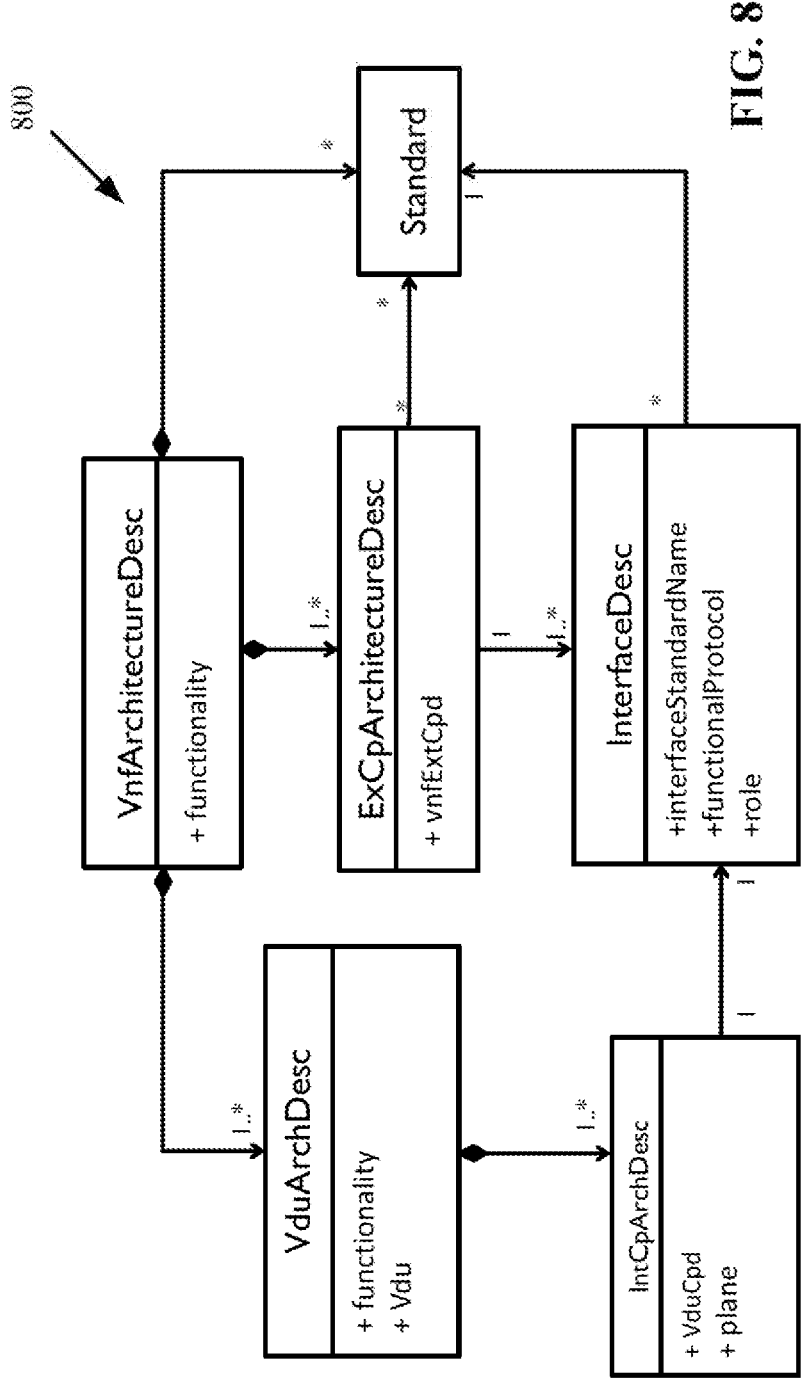
FIG. 8 illustrates a VNF architecture descriptor meta-model according to one embodiment.

FIG. 8 illustrates a VNF architecture descriptor meta-model 800 according to one embodiment. The meta-model 800 provides application level information about the VNF such as its functionality, the functionalities of its VNFCs, and the interfaces through which these functionalities are exposed, whether they are internal or external CPs. Such information is expected to be provided in the VNF Package by the VNF vendor.

The meta-model 800 consists of a root element, the VNF Architecture Descriptor, describing the application level information for the VNF itself. It can have one or more VDU architecture descriptor describing the functionality of one or more VNFC, each of which has one or more internal CP architecture descriptor. For an interface exposed by an internal CP, an interface descriptor element provides information about the functional protocol, the related standard, the standard name of the interface and roles. An interface descriptor element may also describe an external interface of the VNF. In this case it is associated with an external CP architecture descriptor element, which references the corresponding external CPD in the VNFD.

An interface descriptor element can be mapped in the NF Ontology to the interface info and to the architectural dependency of an AB.

Figure 9:
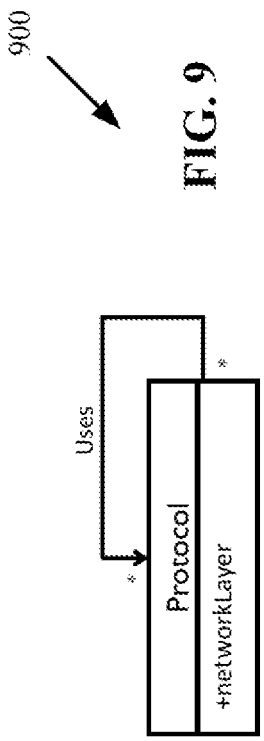
FIG. 9 illustrates a protocol stack meta-model 900 according to one embodiment.

FIG. 9 illustrates a protocol stack meta-model 900 according to one embodiment. An instance of the meta-model 900 describes a valid protocol stack, where each protocol may use a set of protocols. And vice versa, each protocol may be used by a set of protocols.

Figure 10A:
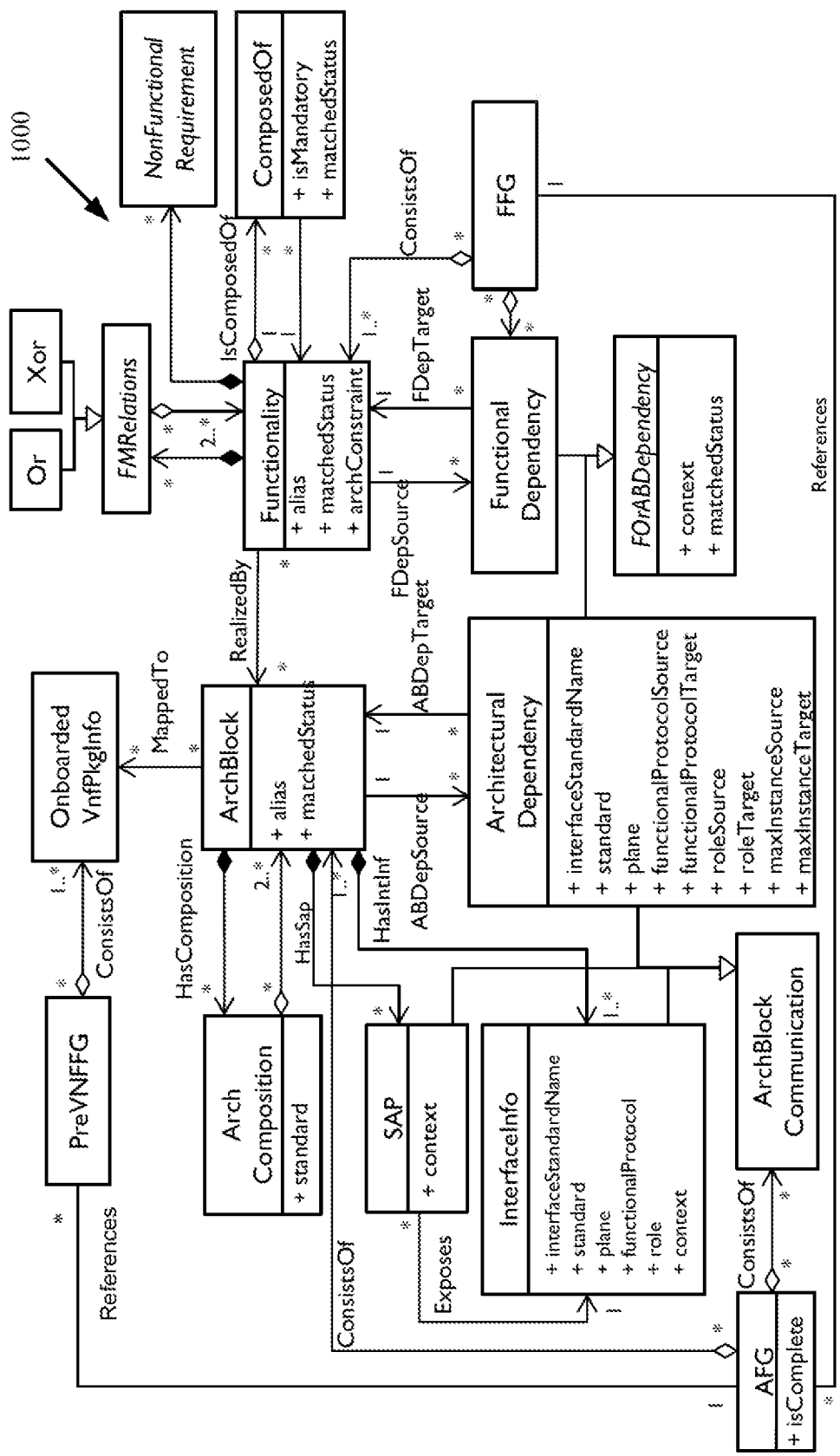
FIGS. 10A and 10B illustrates a solution map (SM) meta-model according to one embodiment.
Figure 10B:
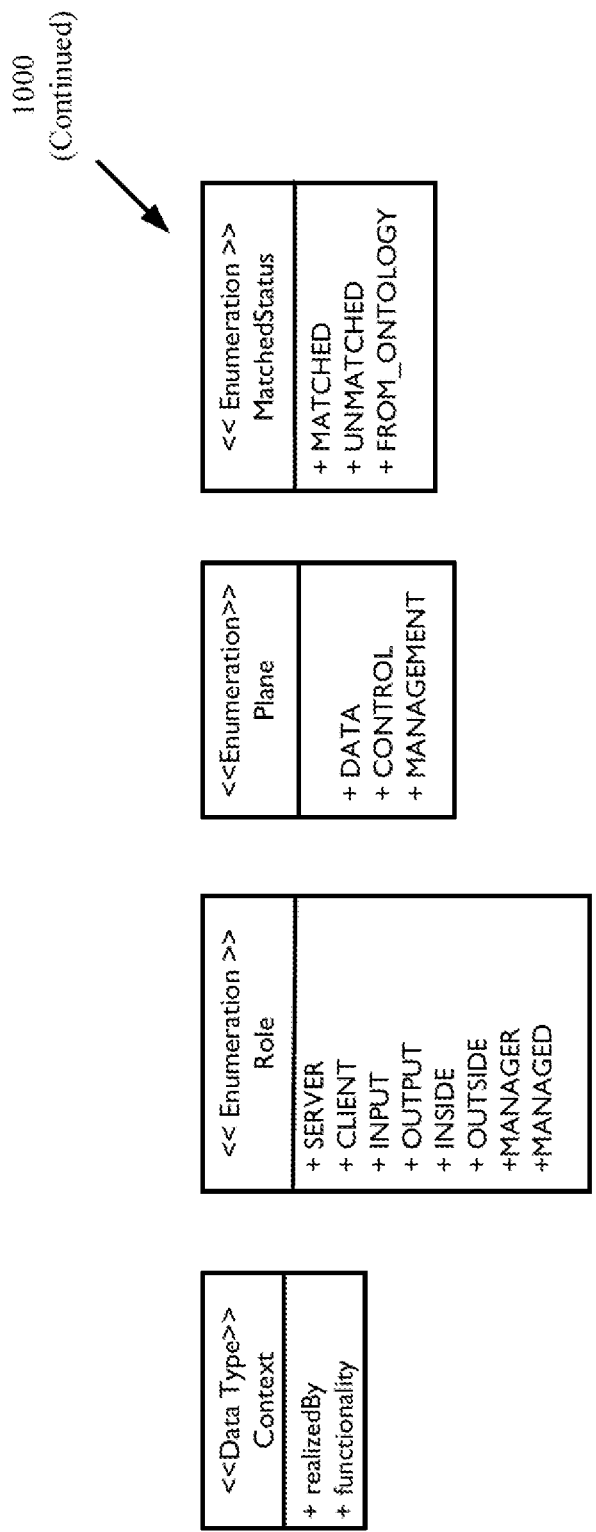

FIGS. 10A and 10B illustrate a solution map (SM) meta-model 1000 according to one embodiment. The meta-model 1000 integrates the different pieces of information captured through the other models and is the basis for generating all possible valid NSDs.

The meta-model 1000 defines elements to combine the three main input models: NSReq, NF Ontology, and VNF Catalog, and the relations between the elements of these models. In addition, the meta-model 1000 also includes elements to capture the three different FGs: FFG, AFG, Pre-VNFFG, which are used in the design process of VNFFGs.

Throughout the NS design method, an instance of the SM model evolves from being initialized by the information of NSReq. The SM is enriched by the information on functional and architectural decompositions selected from the NF Ontology, which in turn is matched with the functionalities and ABs of VNFs in the VNF Catalog. The selected VNFDs are also added to the SM model. Finally, from the captured information the different FGs are generated and added to the SM model as well.

Figure 11:
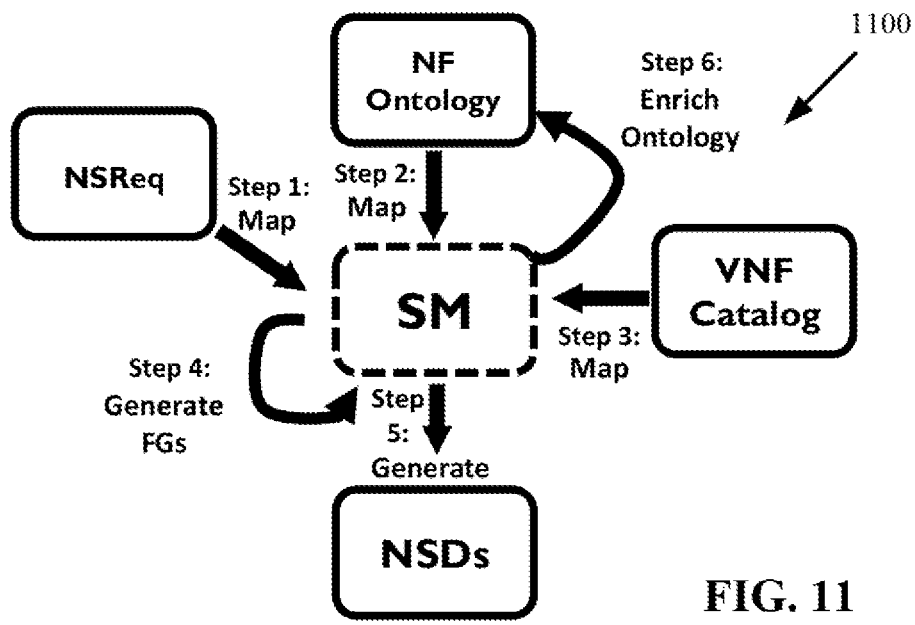
FIG. 11 illustrates a process of designing a network service and generating NSD according to one embodiment.

FIG. 11 illustrates a process 1100 of designing a NS and generating NSD according to one embodiment. The process 1100 starts from receiving an NSReq. In one embodiment, the process 1100 includes six main steps: (Step 1) SM model initialization; (Step 2) mapping SM model to NF Ontology; (Step 3) mapping SM model to VNF Catalog; (Step 4) FGs generation; (Step 5) NSDs generation; and (Step 6) NF Ontology update.

In step 1 the SM model instance is created and initialized from the received NSReq model. In step 2 the SM model, which at this point consists of the functional, architectural and non-functional requirements, is mapped to the NF Ontology, and the matching elements with their relations are added to the SM. In step 3, based on the ABs in the SM model, matching VNFs are selected from the VNF Catalog and added to the SM model. In step 4 for the desired NS some or all possible Pre-VNFFGs are generated, where the Pre-VNFFGs describe the different flows for the NS. In step 5 the NSDs are generated including the VNFFGs. In step 6, any new NS design is added to the NF Ontology.

The NSD generated in step 5 can be onboarded to the NFV-MANO for deployment or can be further refined based on the NFRs. Further details of each of the six steps are provided below.

Step 1—SM model initialization. In this step, a SM model instance is created and initialized from NSReq model. That is, all the elements in the NSReq are transformed into corresponding SM model elements. For instance, each FR in the NSReq is transformed into a functionality in the SM and each AR into AB. These elements are marked as coming from the NSReq. Later on, other elements including other functionalities and ABs are going to be added to the SM model from the NF Ontology. In this step, all the elements and relations except NFRs are tagged as unmatched since they are not yet matched with NF Ontology elements. These tags are used in the next steps.

Step 2—Mapping SM model to NF Ontology. In this step, additional information is added from the NF Ontology to the SM model. The functionalities in the SM are matched with functionalities of the NF Ontology, and any additional information on them in the NF Ontology is added to the SM. This includes functional decompositions and dependencies as well as the ABs realizing them and their decompositions.

Figure 12:
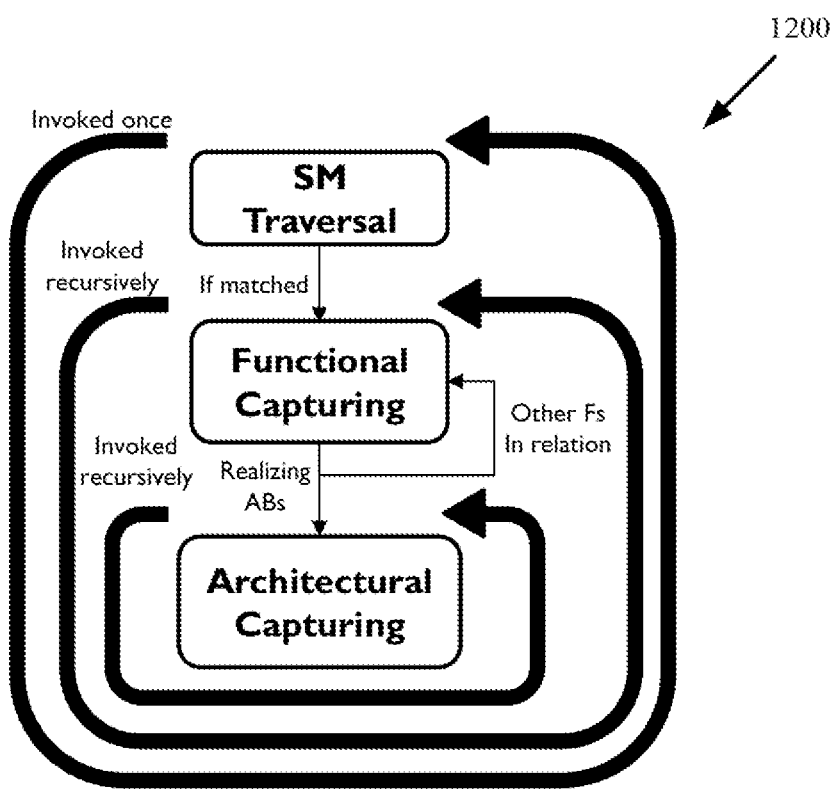
FIG. 12 illustrates a process of mapping the SM to the NF Ontology according to one embodiment.

FIG. 12 illustrates a process 1200 of mapping the SM to the NF Ontology according to one embodiment. The process 1200 is as follows: The SM is traversed starting from the root to the leaves. Each unmatched functionality or AB in the SM is checked against the functionalities or ABs of the NF Ontology to find all matching ones. For a match, the name in the SM should match the name or any of the aliases in the NF Ontology. The tag of those for which at least one match is found is changed from unmatched to matched.

Next for the matched functionalities and ABs, other lower-level functionalities and realizing ABs are added together with their dependencies as appropriate from the NF Ontology to the SM. This process is recursive and performed for both functionalities and the ABs, and is referred to as Functional and Architectural Capturing in FIG. 12. As a result, whole sub-trees of the NF Ontology, which are rooted in a matched element are added to the SM all the way to their leaves.

As mentioned earlier, there are two cases to consider in the process 1200. The first case is when the tenant provided FRs with or without ARs. In this case, the unmatched functionalities are traversed in the SM and matched to the NF Ontology and then the Functional Capturing is invoked for each functionality. In the second case the tenant does not provided any FRs, only ARs. In this case, unmatched ABs are traversed in the SM instead of functionalities. The ABs in SM are matched to ABs in the NF Ontology, and for each, all the functionalities they realize are added to the SM with an unmatched tag and without any of their relations. At this point, the SM is same as the first case with unmatched functionalities and the method proceeds in the same way.

Functional Capturing: This routine finds information in the NF Ontology on a functionality which does not exist in the SM model yet and adds it to the SM. This includes all the functional dependencies and decompositions, OR and XOR relations of the functionality and the related through these relations other functionalities, as well as the ABs realizing the functionalities. This process is performed recursively, i.e. for each newly added functionality the same routine is performed until no more relations are found.

When the dependency relations are added to the SM, it is checked that all functional dependencies of a functionality in the NF Ontology whose context exists in the SM should also exist in the SM. In each dependency, if the supplier functionality does not exist in the SM, the supplier functionality and the dependency are added.

Similarly, mandatory decomposition relations are checked in the NF Ontology. The children functionalities that do not exist in the SM are added to the SM. OR and XOR relations are handled similarly, i.e. the relation is created and all missing child functionalities are added.

The Realized By relations of a functionality in the NF Ontology are taken into account based on the ARs of the functionality. If the functionality has no AR, all ABs are added to the SM. If the functionality has AR constraints, no AB is added since they already exist in the SM. The AR constraints are applied to the functionality's children functionalities.

Architectural Capturing: This routine works similarly for the ABs as the Functional Capturing for the functionalities. It finds in the NF Ontology the information missing in the SM and adds it. This includes architectural dependencies and compositions, service access points and interface info. Whenever an AB in SM is matched to an AB in the NF Ontology the SAP and Interface Info are added from the NF Ontology to the SM if their contexts exist in the SM.

Similarly, architectural dependency relations and the related ABs are added considering their context. If the dependency does not have any context, and if the supplier AB does not exist they are added. Otherwise the missing information is added only if the context exists in the SM.

Finally, the composing child ABs of an architectural composition relation of an AB are added as appropriate.

Continuing with Step 3 of FIG. 11—Mapping SM model to the VNF Catalog. In this step, the VNFs appropriate for the NS are selected based on the functionalities they provide respecting the architectural constraints.

A VNF may provide one functionality or a set of functionalities. Also, a VNF may be realized as a single AB or a set of ABs. Looking from another angle, the same functionality may be provided by different VNFs, which may have different ABs. All these variations need to be taken into account.

At this point the SM model contains both the functional and architectural aspects of the NS design, the SM model is mapped to the VNF Catalog to find the appropriate VNFs. The VNF Catalog is the composition of onboarded VNF packages, each of which is described by an onboarded VNF package info model, which includes the VNFD and the VNF architectural info for the VNF. The latter describes the ABs of the VNF and includes the information about its functionalities.

To find the appropriate VNFs, the NS design method maps all the ABs in the SM to the onboarded VNF packages in the VNF Catalog by matching them to the ABs of the VNFs and their functionalities. To have a solution for an NS design, for each functionality in the SM, the method finds a VNF which can provide the functionality. Since in the SM a functionality may have realized-by relations with alternative ABs, there may exist alternative NS designs. To complete an NS design, for each of its ABs in the SM, at least one VNF needs to be found in the VNF Catalog. If many VNFs can be matched, then yet again there can be different alternative solutions. This combinatorial aspect is taken into account in the next step at the generation of FGs.

The onboarded VNF package info of the matched VNFs is added to the SM (if it does not exist yet) and is associated with the appropriate AB(s).

Figure 13:
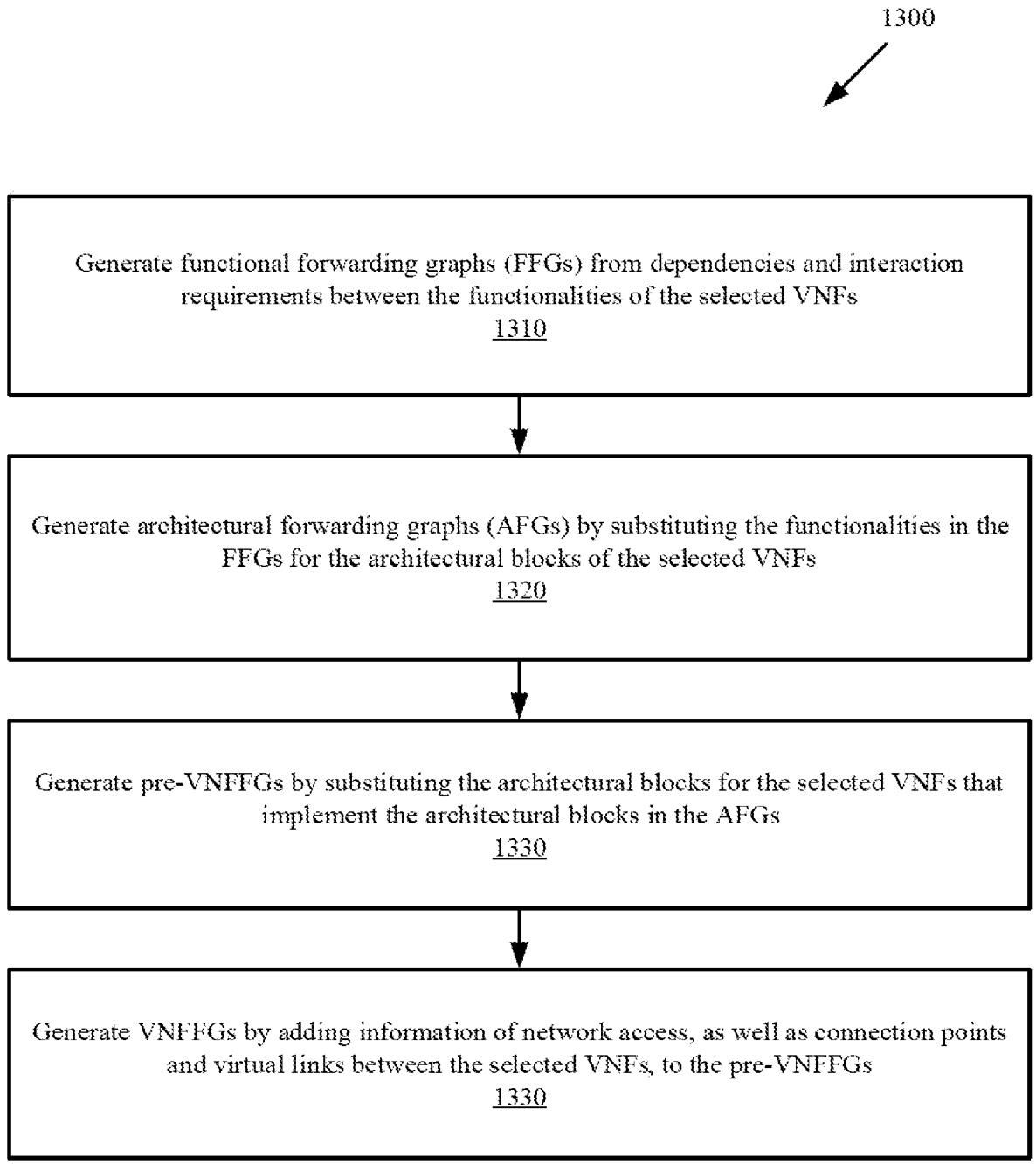
FIG. 13 is a flow diagram illustrating an overview of a method for generating a VNFFG according to one embodiment.

FIG. 13 is a flow diagram illustrating an overview of a method 1300 for generating forwarding graphs, in particular, the VNFFGs according to one embodiment. Details of the method 1300 will be described in step 4 and step 5 below. The method 1300 may be performed by a network service provider's system, such as an OSS/BSS system or another network management system, embodiments of which are shown in FIGS. 17-20. At 1310, the system generates FFGs from dependencies and interaction requirements between the functionalities of the selected VNFs. At 1320, the system generates AFGs by substituting the functionalities in the FFGs for the architectural blocks of the selected VNFs. At 1330, the system generates pre-VNFFGs by substituting the architectural blocks for the selected VNFs that implement the architectural blocks in the AFGs. At step 1340, the system generates VNFFGs by adding information of network access points, as well as connection points and virtual links between the selected VNFs, to the pre-VNFFGs. The VNFFGs are part of an NSD for deploying an NS.

Continuing with Step 4 of FIG. 11—FGs Generation. In this step, the FGs for some or all alternative solutions are generated. First the method generates the FFGs, then based on the FFGs, the method generates the AFGs and finally the Pre-VNFFGs.

There are three aspects in the SM model that results in different combinatorial solutions.

The first one is the different levels of functional decompositions, i.e. different implementations may exist for the same functionality at different levels of its decomposition. Combining of these different decompositions of functionalities at different levels can result in many solutions. Each FFG will capture one of those options, which means that each FFG covers all the functionalities required for realizing the NS, regardless of the level of their functional decomposition.

The second combinatorial aspect comes from the possibility that each functionality can be realized by different ABs. Combining each of these options for each functionality can be a separate solution for the NS. This combinatorial aspect is taken into account in the generation of the AFGs. In some cases, it may even be possible to combine together different ABs from different architectural decompositions as alternative solutions. This is one of the challenges of this step. An AFG is generated based on an FFG by substituting the functionalities with the realizing ABs and all other ABs in the architectural dependency chain for the functionality. Each AFG provides an alternative solution for the NS taking into account the architectural aspects.

The third combinatorial aspect is the result of the alternative VNFs matched with each AB. The combination of each of these options result in a different Pre-VNFFG which further increase the alternative solutions for the NS. A Pre-VNFFG is generated from an AFG by substituting each ABs with a VNF. The architectural dependencies in that AFG imply the flow of communication between the VNFs in the Pre-VNFFG.

Generating FFGs: The process of generating the FFGs is a recursive process which starts from the root functionality in the hierarchy of SM functionalities. It is invoked for each of the child functionalities and it returns all the possible FFGs in the context of the functionality on which it was invoked. When the functionality is a leaf functionality, the process only returns the functionality itself. When the functionality is not a leaf and it has children, the process combines all the FFGs resulting from the invocations on its children and adds itself as another FFG to the set of results, and returns the set.

By this recursive procedure, all the possible combinations of functional decompositions propagate from the leaves to the root. At the NS root level, the FFGs are the result of the FFGs generating process.

Generating AFGs: This routine is invoked for each of the generated FFGs. Each of functionalities in the FFG is substituted by an AB or a set of ABs realizing the functionality. By combining different options of substitution for each functionality, all the possible AFGs are generated. In the process, all the architectural dependencies in those AB chains are added to the AFGs as appropriate. The SAPs and interface info elements of the substituted ABs are also added if their context exists in the FFG.

Some AFGs may have ABs from different architectural compositions with missing dependencies. However, since dependencies are the basis of the communication between ABs and VNFs, these AFGs are incomplete at this point. Therefore, these missing architectural dependencies need to be created in the AFG to complete them.

A group of ABs realizing a single functionality in the FFG but taken out of an architectural composition may have some disconnected architectural dependencies. These are dependency relations with other ABs in the architectural composition from which the group was taken out, which are not part of the AFG. These dependencies are re-created. For this purpose, the method groups ABs with disconnected dependencies towards the same functionalities with the same role (e.g. source or target), and matches up the groups that complement each other based on the role (e.g. source with target role for the same functionality). This way the missing dependencies can be re-recreated. These re-created dependencies are specific to an AFG.

Generating Pre-VNFFG: A Pre-VNFFG is generated by substituting the ABs of an AFG with the VNFs. Since each AB has a set of mapped VNFs, this substitution can be done in multiple ways. By multiplying all the sets together, the method identifies a set of VNFs that covers the whole AFG as a Pre-VNFFG.

To generate a VNFFG, the appropriate CPs, SAPs and VLs interconnecting the VNFs are added to the pre-VNFFG. That is, the interconnecting virtual networking elements are specified to connect the VNFs to each other and toward the customers. The process of generating a VNFFG is described in step 5.

Continuing with Step 5 of FIG. 11—NSDs Generation. The Pre-VNFFGs provide the information to generate the NSDs including their VNFs, forwarding graphs and the information about the interfaces and service access points. One NSD is generated for each Pre-VNFFGs.

In this process, first, the NSD instance is created with the basic attributes such as name, ID and date. Then the references to the VNFD of all the VNFs of the Pre-VNFFG are added. After that, for each architectural dependency or a group of them in the corresponding AFG, a VLD is created. Also, for each SAP in that AFG a SAPD is created for the NSD. Next, the VNFFGDs are created for all possibilities with references to the VLDs and SAPDs as appropriate. The different VLs, CPs and SAPs may belong to different planes—data, control, and management—and in the NSD a VNFFGD is created for each. Each VNFFGD references the associated VNFDs and VLDs of that specific plane. Finally the set of CPD pools (CpdPool) of the associated CPDs and different network forwarding paths are created. Some of these steps are elaborated further below.

Creating VLDs: An architectural dependency has one AB on each side, i.e. a client and a supplier. Each of these ABs is mapped to a VNF. At first, for each architectural dependency an appropriate connection point is selected for each of those VNFs to connect them through a VL.

Each architectural dependency provides information about the required interfaces for both sides, including the standard, the standard name of the interface, the network plane, the source and the target protocols and roles. For a VNF a CP is selected with the same network plane, same standard and standard name of the interface as provided in the architectural dependency. If the standard name of the interface is not required by the architectural dependency, then the required role and protocol are checked to find the correct CP. If any of these parameters could not be matched to a CP of the VNF, there is no appropriate CP to select and the VNFFG cannot be created. After finding the proper CP for each VNF the type of the VL is determined.

In the NSD design, architectural dependencies required to connect to the same CP on a VNF may require a Mesh. Each of those architectural dependencies on their other side may connect to other architectural dependencies by sharing the same CP. As a result, a mesh of architectural dependencies may form, and all these architectural dependencies together make a Mesh VL. Through recursion, the method captures the chain of architectural dependencies with shared CPs and, for each architectural dependency, a Mesh VL is created if the number of architectural dependencies is more than one, and a Line VL if the number is one.

Creating SAPDs: The SAPs of a NS are associated with the VNFs through the AFG. For each of these SAPs a SAPD is created and associated with the right CP of that VNF. For this first, the appropriate CP of the VNF to which the SAP to be connected is selected using the interface info of the AB. It defines the required characteristics of the interface for the SAP including the standard and the standard name of the interface, the plane, role, and protocol. After selecting the right CP, other attributes of the SAPD including the layer protocol, CPD role, and etc. are set. Since the SAP exposes the CP of the VNF to the outside of the NSD, the SAP attributes are exactly same as the CP's attributes, so they are set same as they are for the CP.

Creating VNFFGD: To generate the VNFFGD for each plane, first, the VNFDs, VLDs, and SAPDs associated with the same plane are grouped together.

The plane of VLs and SAPs is determined based on the plane of the CPs they are connected to. Each of those can only be associated with one plane. The plane of VNFs is also determined by the plane of their CPs, which are associated with a VL or SAP. If a CP is not associated with any VL or SAP, that means it is inactive and not used in the NS and not considered in any VNFFG. A VNF can be associated with different planes if it has active CPs on those planes. The VNFDs and their active CPDs for each plane are also added to the group of the appropriate plane.

For each plane, a VNFFGD is created which references all the associated VNFDs and VLDs in that group. When a VNF is referenced in a VNFFG, it means it has at least one active CP on the plane of the VNFFG. So, for each of the VNFDs in the VNFFGD, a CpdPool is created which references all the CPDs of that VNFD. A CpdPool is created to reference all the SAPDs.

Creating NFPDs: An NFP is a sequence of CPs providing a path for a specific flow of packets within the VNFFG. These paths are differentiated based on different sequences of functionalities in the FFG of the NS.

Each functional sequence is determined by a chain of functional dependencies. Each functionality can only have one outgoing dependency in a chain. Functionalities with more than one outgoing dependencies result in more than one chains. Each chain starts from a functionality with only outgoing dependencies (a functionality which is only a client of dependencies not a supplier) and finishes with a functionality with only incoming dependencies (only a supplier functionality in the dependencies, not client).

The aforementioned operations of step 5 are executed for each of the VNFFGDs. It starts from finding all the functionalities in the FFG which are client-only, and down the road, they map to a VNF in that VNFFG. For each of those client-only functionalities, the recursive part of the algorithm is invoked, which creates a sequence of functionalities. It adds the functionality itself to the sequence then, for each of the supplier functionalities of the outgoing dependencies of the functionality, it invokes the algorithm and gives it the functionality sequence as input. If the functionality is a supplier-only functionality, it is the end of the chain, and the algorithm adds the functionality to the sequence and returns the sequence. This sequence is a complete functionality chain.

Since this functional chain is seamlessly connecting the functionalities, it is certain that the realizing ABs in the corresponding AFG also create a seamless chain. Each of the architectural dependencies is associated with a VL and as a result, based on the created functional chain, a seamless VNF chain also exists with VLs in the same plane connecting them. Ultimately, this chain results in a seamless chain of CPs which are all active on the same plane. So, from each of the created chains first, an NFPD element is created. Then, all the CPDs of the VNFDs which correspond to one of the functionalities in the chain and exist in that VNFFGD, are referenced from the NFPD.

With respect to NS Deployment Flavor and Profiles, these elements are related primarily to non-functional characteristics of the NS. However, they also convey some information related to functional characteristics. This information is about the connections between the CPs of the VNFs and the VLs. This information is part of the VNF Profile, which is a constituent of the NS Deployment Flavor and it references the profile of the specific VLD, another NS Deployment Flavor constituent. Therefore, at this point, an empty VNF Profile is created for each VNFD, and an empty VL Profile is created for each VLD to hold the information of their connections which were created in previous steps.

Continuing with Step 6 of FIG. 11—NF Ontology Update. The NF Ontology is constantly updated and enriched with new functional and architectural decompositions from successful NS designs and whenever a new VNF is onboarded into the VNF Catalog. The first category of updates is performed as part of the NSD generating process. At step 6 of the NSD generation process it is checked if the NF Ontology needs to be updated and this update is performed automatically. The second category of updates is performed outside of the NSD generation process. These updates may be performed automatically or manually.

Within the NSD Generation Process: Such an update happens once the NSDs have been generated and it relies on the new decompositions and functionalities requested by the tenant as part of the NSReq. The main condition for this update is in the successful generation of NSDs, which means the information of the NSReq is valid and can be used to update the NF Ontology. There are two cases in this category:

Case 1 is when a functionality is not matched to the functionalities in the NF Ontology, but its decomposition is completely matched to at least one decomposition in the ontology. In this case, the name of the unmatched functionality will be added as an alias for the functionality having similar decomposition in the ontology.

Case 2 is when neither the functionality nor the composition are matched to the NF Ontology, but all the composing functionalities exist in the NF Ontology. This means that the tenant requested a new valid composition therefore the new functionality with the requested decomposition are added to the NF Ontology.

Without the NSD Generation Process: This kind of update can happen anytime without the NSD generation process. There are two different cases:

In Case 1, when a new VNF Resource Package is onboarded to the VNF Catalog, the system checks if its ABs and functionalities exist in the NF Ontology. If not, the missing information is added to the NF Ontology including the VNF's interfaces. This allows the system to reuse these functionalities and ABs to form new NSs and architectural compositions.

In Case 2, the NF Ontology may also be updated by an expert to add new functionalities and functional decompositions, ABs and architectural compositions, different relations between them, and setting the attributes of all those elements. This may happen typically for adding new standard NFs and NSs. Also, the expert can update any existing information in the ontology as needed.

Figure 14:
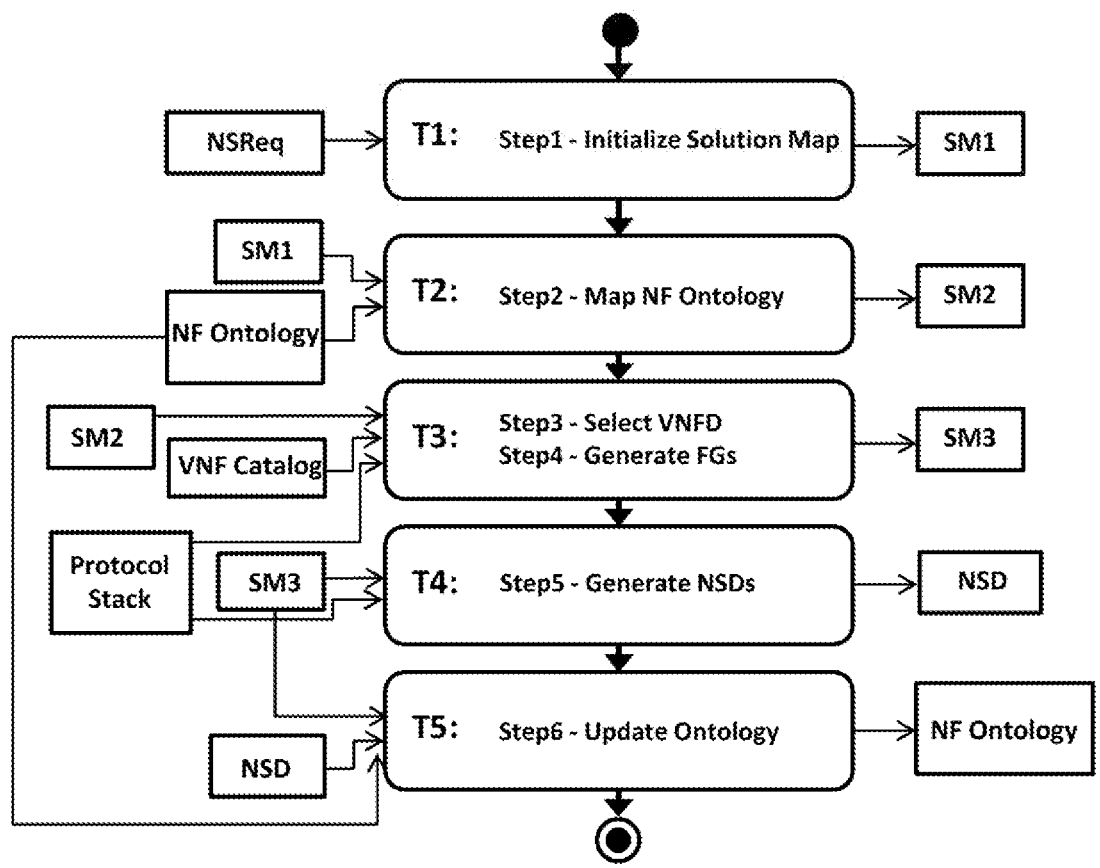
FIG. 14 illustrates a flow diagram of implemented transformations for design a network service in association with input and output models according to one embodiment.

Prototype Implementation. The aforementioned six steps have been implemented using the Atlas Transformation Language (ATL) as the model-to-model transformation language. FIG. 14 illustrates a flow diagram of implemented transformations for designing a network service in association with the input and output models according to one embodiment. The implementation was done using Papyrus which is a UML modeling tool in which the meta-models were developed as UML profiles extending UML class diagram. The model instances also were developed using UML class diagram, conforming to the corresponding UML profiles as the meta-models. As an example for testing the transformations, an NF Ontology model instance was developed based on VoIP service and IMS as an architecture.

Figure 15:
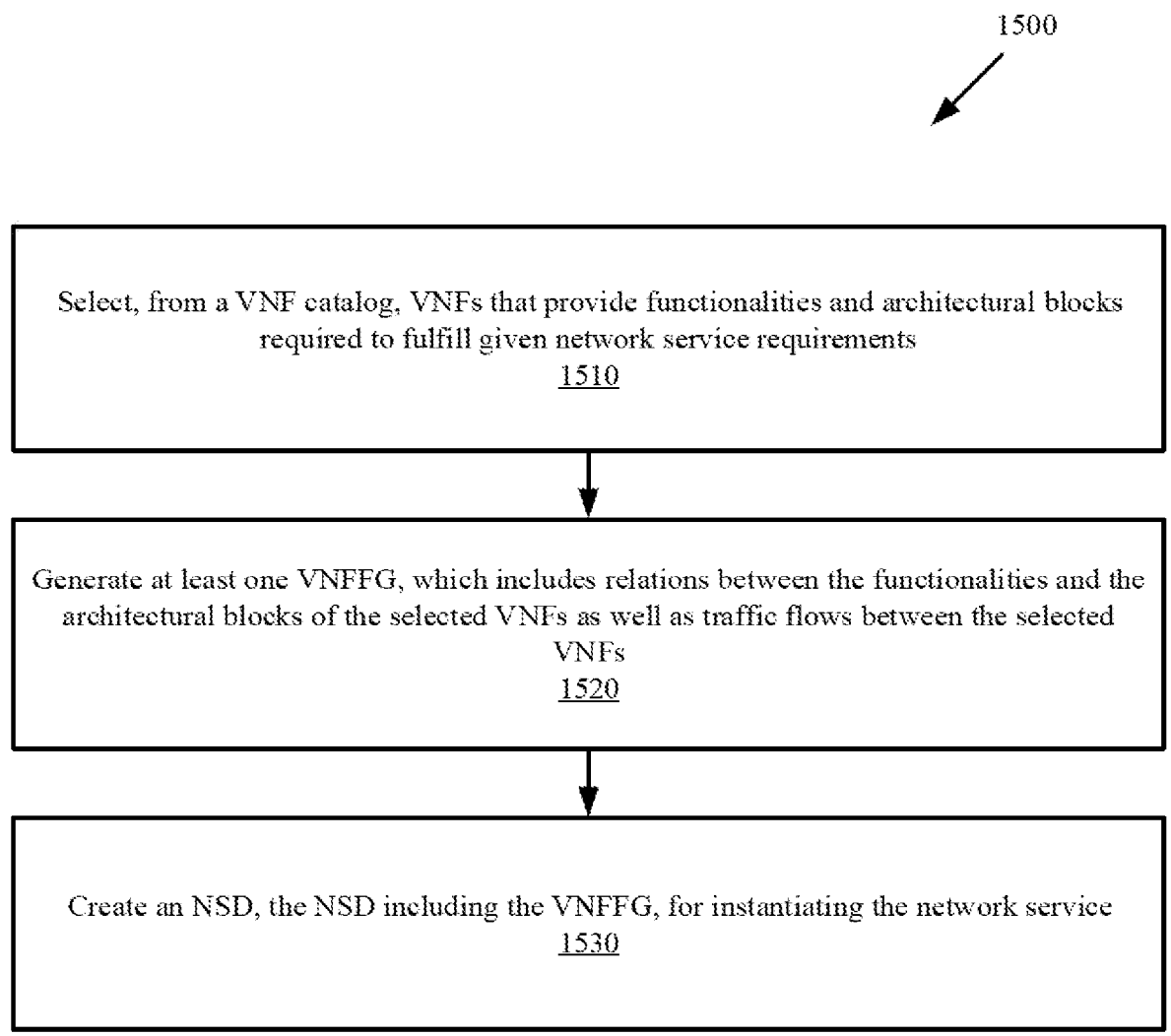
FIG. 15 is a flow diagram illustrating a method for generating an NSD according to one embodiment.

FIG. 15 is a flow diagram illustrating a method 1500 for generating an NSD according to one embodiment. The method 1500 generates, from VNFs existing in a VNF catalog, an NSD for instantiating a network service which satisfies given NS requirements. The method 1500 may be performed by a network service provider's system, such as an OSS/BSS system or another network management system, embodiments of which are shown in FIGS. 17-20. A method for generating an NSD has been previously described in relation with FIGS. 11-15, for example, and the method 1500 may further or alternatively comprise any of the steps described in relation with FIGS. 11-15.

Figure 16:
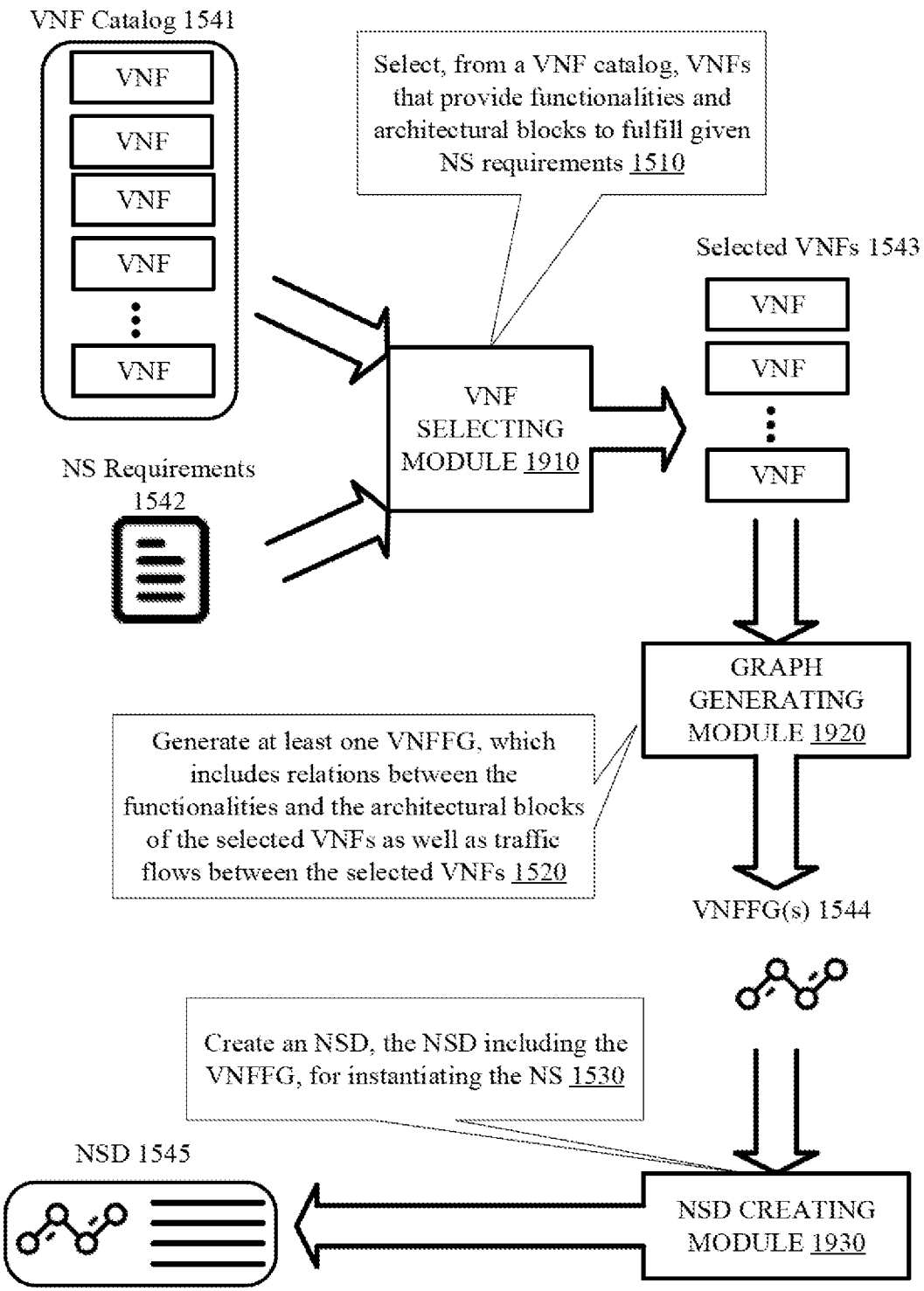
FIG. 16 is another diagram illustrating the method of FIG. 15.

Referring also to the diagram of FIG. 16, which illustrates the method 1500 performed by a VNF selecting module 1910, a graph generating module 1920 and an NSD creating module 1930. The steps of the method 1500 are also shown in FIG. 16. The method 1500 begins at step 1510 when the VNF selecting module 1910 selects, from the VNF catalog 1541, VNFs that provide functionalities and architectural blocks required to fulfill the NS requirements 1542. The graph generating module 1920 at step 1520 generates at least a VNFFG 1544, which includes relations between the functionalities and the architectural blocks of the selected VNFs 1543 as well as traffic flows between the selected VNFs 1543. The NSD creating module 1930 at step 1530 creates the NSD 1545, the NSD 1545 including the VNFFG 1543, for instantiating the NS.

Figure 17:
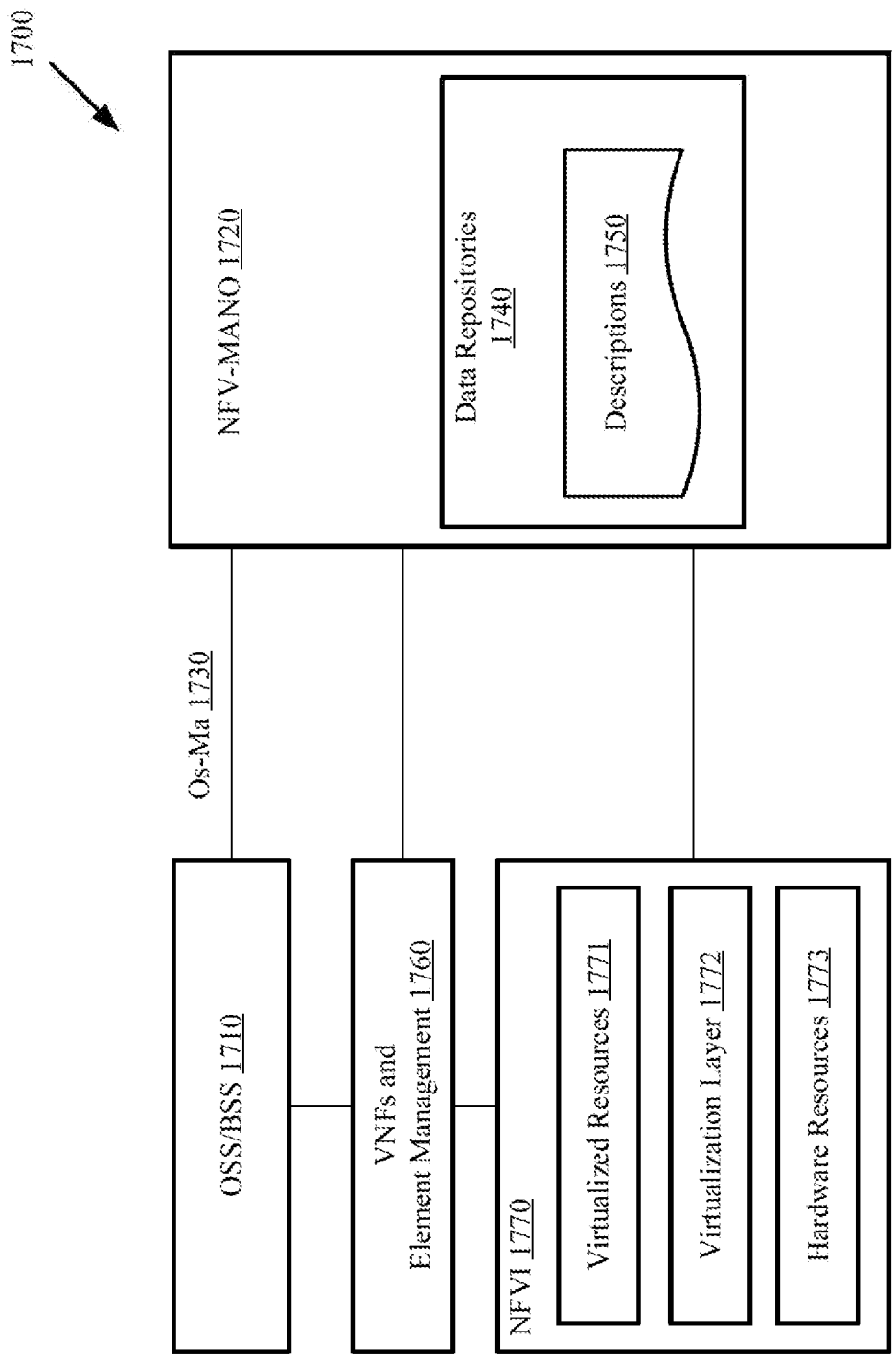
FIG. 17 is a block diagram illustrating an NFV system framework.

FIG. 17 is a block diagram illustrating an overview of an NFV system framework 1700. In one embodiment, after an NSD is generated, an OSS/BSS 1710 initiates the onboarding of the NSD with an NFV-MANO 1720, e.g. by delivering the NSD via an Os-Ma reference point 1730. The onboarded NSD may be stored in the NFV-MANO 1720, e.g., in data repositories 1740 as part of Descriptions 1750 that include descriptions of service, VNF and infrastructure. The OSS/BSS 1710 may use the same reference point 1730 for communicating with the NFV-MANO 1720 to instantiate an NS instance based on the onboarded NSD.

In one embodiment, the VNF Catalog used by the OSS/BSS 1710 for generating the NSD may also be stored in the NFV-MANO 1720 as part of the Descriptions 1750. The network provider or operator, who operates the NFV system framework 1700, onboards the VNFs delivered by a VNF vendor. As part of this onboarding, descriptions of the VNF implementation including the VNFD with the Architecture Descriptor (i.e. the VNF architecture descriptor element 510 of FIG. 5) are delivered to the NFV-MANO 1720 as part of a VNF package containing the implementation and put into the VNF Catalog.

Figure 19:
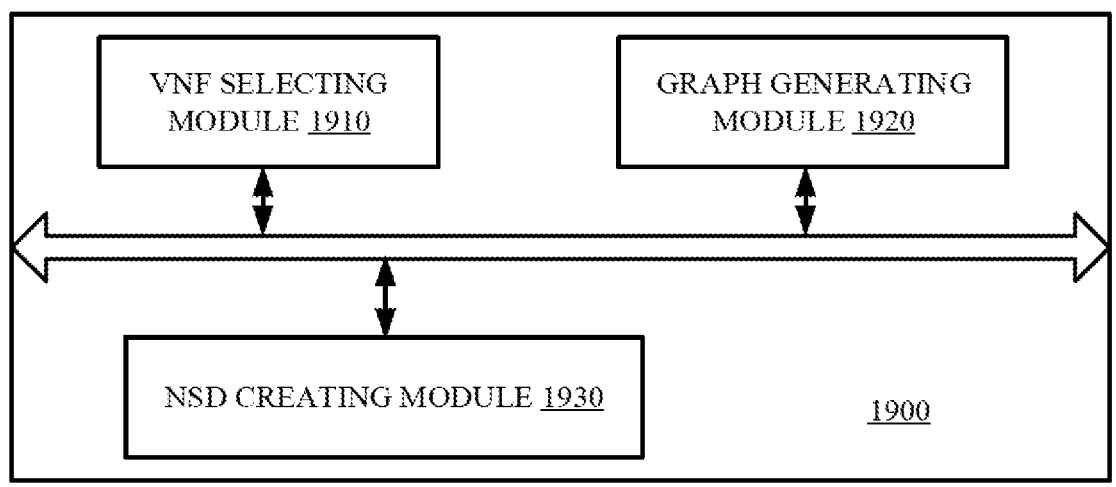
FIG. 19 is a block diagram of a network node according to another embodiment.

In one embodiment, the OSS/BSS 1710 may include the VNF selecting module 1910, the graph generating module 1820 and the NSD creating module 1930 of FIG. 16 and FIG. 19 for generating an NSD.

The block diagram of FIG. 17 illustrates further details of the NFV system framework 1700, such as an NFVI 1770 including hardware resources 1773, virtualized resources 1771, and a virtualization layer 1772 which abstracts the hardware resources 1773 and decouples the virtualized resources 1771 from the underlying hardware resources 1773. The NFV system framework 1700 further includes VNFs and element management 1760 which manage the VNFs.

Figure 18:
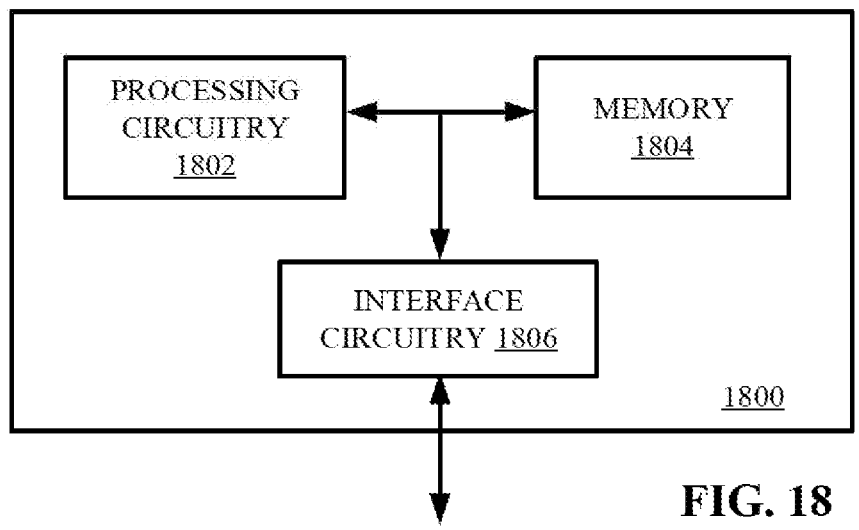
FIG. 18 is a block diagram of a network node according to one embodiment.

FIG. 18 is a block diagram illustrating a network node 1800 according to an embodiment. In one embodiment, the network node 1800 may be a server in an operator network or in a data center. The network node 1800 includes circuitry which further includes processing circuitry 1802, a memory 1804 or instruction repository and interface circuitry 1806. The interface circuitry 1806 can include at least one input port and at least one output port. The memory 1804 contains instructions executable by the processing circuitry 1802 whereby the network node 1800 is operable to perform the various embodiments described herein.

FIG. 19 is a block diagram of an example network node 1900 according to another embodiment. The network node 1900 is adapted to generate an NSD from VNFs existing in a VNF catalog for instantiating a network service which satisfies given NS requirements. The network node 1900 includes the VNF selection module 1910, the graph generating module 1920 and the NSD creating module 1930, the operations of which have been described before in connection with FIG. 15 and FIG. 16. The network node 1900 can be configured to perform the various embodiments as have been described herein.

Figure 20:
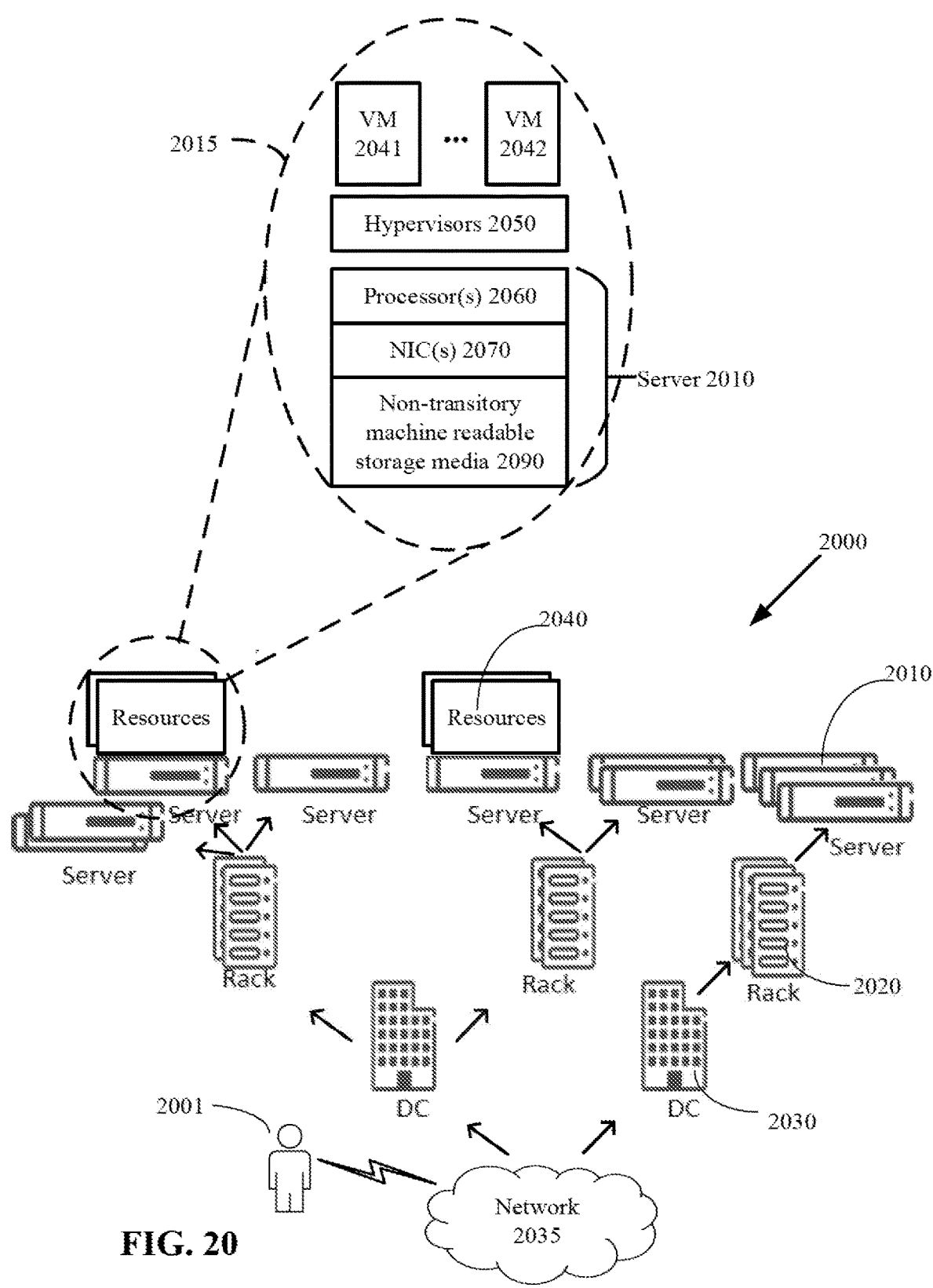
FIG. 20 is an architectural overview of a cloud computing environment according to one embodiment.

FIG. 20 is an architectural overview of a cloud computing environment 2000 that comprises a hierarchy of a cloud computing entities. The cloud computing environment 2000 can include a number of different data centers (DCs) 2030 at different geographic sites connected over a network 2035. Each data center 2030 site comprises a number of racks 2020, each rack 2020 comprises a number of servers 2010. It is understood that in alternative embodiments a cloud computing environment may include any number of data centers, racks and servers. A set of the servers 2010 may be selected to host resources 2040. In one embodiment, the servers 2010 provide an execution environment for hosting entities and their hosted entities, where the hosting entities may be service providers and the hosted entities may be the services provided by the service providers. Examples of hosting entities include virtual machines (which may host containers) and containers (which may host contained components), among others. A container is a software component that can contain other components within itself. Multiple containers can share the same operating system (OS) instance, and each container provides an isolated execution environment for its contained component. As opposed to VMs, containers and their contained components share the same host OS instance and therefore create less overhead. Each of the servers 2010, the VMs, and the containers within the VMs may be configured to perform the various embodiments as have been described herein.

Further details of the server 2010 and its resources 2040 are shown within a dotted circle 2015 of FIG. 20, according to one embodiment. The cloud computing environment 2000 comprises a general-purpose network device (e.g. server 2010), which includes hardware comprising a set of one or more processor(s) 2060, which can be commercial off-the-shelf (COTS) processors, dedicated Application Specific Integrated Circuits (ASICs), or any other type of processing circuit including digital or analog hardware components or special purpose processors, and network interface controller(s) 2070 (NICs), also known as network interface cards, as well as non-transitory machine readable storage media 2090 having stored therein software and/or instructions executable by the processor(s) 2060.

During operation, the processor(s) 2060 execute the software to instantiate a hypervisor 2050 and one or more VMs 2041, 2042 that are run by the hypervisor 2050. The hypervisor 2050 and VMs 2041, 2042 are virtual resources, which may run node instances in this embodiment. In one embodiment, the node instance may be implemented on one or more of the VMs 2041, 2042 that run on the hypervisor 2050 to perform the various embodiments as have been described herein. In one embodiment, the node instance may be instantiated as a network node performing the various embodiments as described herein.

In an embodiment, the node instance instantiation can be initiated by a user 2001 or by a machine in different manners. For example, the user 2001 can input a command, e.g., by clicking a button, through a user interface to initiate the instantiation of the node instance. The user 2001 can alternatively type a command on a command line or on another similar interface. The user 2001 can otherwise provide instructions through a user interface or by email, messaging or phone to a network or cloud administrator, to initiate the instantiation of the node instance.

Embodiments may be represented as a software product stored in a machine-readable medium (such as the non-transitory machine readable storage media 2090, also referred to as a computer-readable medium, a processor-readable medium, or a computer usable medium having a computer readable program code embodied therein). The non-transitory machine-readable medium 2090 may be any suitable tangible medium including a magnetic, optical, or electrical storage medium including a diskette, compact disk read only memory (CD-ROM), digital versatile disc read only memory (DVD-ROM) memory device (volatile or non-volatile) such as hard drive or solid state drive, or similar storage mechanism. The machine-readable medium may contain various sets of instructions, code sequences, configuration information, or other data, which, when executed, cause a processor to perform steps in a method according to an embodiment. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope which is defined solely by the claims appended hereto.

What is claimed is:

1. A method for generating, from Virtualized Network Functions (VNFs) existing in a VNF catalog, a Network Service Descriptor (NSD) for instantiating a network service which satisfies given network service requirements, the method comprising:
   selecting, from the VNF catalog, VNFs that provide functionalities and architectural blocks required to fulfill the network service requirements;
   generating functional forwarding graphs (FFGs) from dependencies and interaction requirements between the functionalities of the selected VNFs;
   generating architectural forwarding graphs (AFGs) by substituting the functionalities in the FFGs for the architectural blocks of the selected VNFs;
   generating at least a VNF forwarding graph (VNFFG), which includes relations between the functionalities and the architectural blocks of the selected VNFs as well as traffic flows between the selected VNFs; and creating the NSD, the NSD including the VNFFG, for instantiating the network service.

2. The method of claim 1, wherein subsequent to generating the AFGs the method further comprises:
generating pre-VNFFGs by substituting the architectural blocks for the selected VNFs that implement the architectural blocks.

3. The method of claim 2, wherein generating at least a VNFFG further comprises:
adding information of service access points (SAPs), connection points (CPs) and virtual links (VLs) to edges of each pre-VNFFG.

4. The method of claim 2, wherein generating at least a VNFFG further comprises:
selecting, from a same plane, SAPs and CPs of all VNFs in each pre-VNFFG; and
creating VLs between the SAPs and the CPs, wherein the same plane is one of a data plane, a control plane, and a management plane.

5. The method of claim 1, wherein the architectural blocks specify interface information including one or more of: a protocol used on an interface, a role of the interface, a network plane, and a standard used by the interface.

6. The method of claim 1, wherein the functionalities of the selected VNFs include requested functionalities specified in the network service requirements and groups of functionalities decomposed from the requested functionalities according to an ontology, wherein the ontology contains decompositions and dependencies of known functionalities and known architectural blocks that realize the known functionalities.

7. The method of claim 1, further comprising:
generating the NSD by a support system of a network service provider;
delivering the NSD from the support system to a Network Function Virtualization management and orchestration (NFV-MANO) as a deployment template for the network service; and
requesting the NFV-MANO to instantiate the network service according to the NSD.

8. A network node comprising:
processing circuitry; and
memory storing instructions executable by the processing circuitry to generate, from VNFs existing in a VNF catalog, an NSD for instantiating a network service which satisfies given network service requirements, the network node adapted to:
select, from the VNF catalog, VNFs that provide functionalities and architectural blocks required to fulfill the network service requirements;
generate functional forwarding graphs (FFGs) from dependencies and interaction requirements between the functionalities of the selected VNFs;
generate architectural forwarding graphs (AFGs) by substituting the functionalities in the FFGs for the architectural blocks of the selected VNFs;
generate at least a VNFFG, which includes relations between the functionalities and the architectural blocks of the selected VNFs as well as traffic flows between the selected VNFs; and
create the NSD, the NSD including the VNFFG, for instantiating the network service.

9. The network node of claim 8, wherein subsequent to generating the AFGs the network node is further adapted to:
generate pre-VNFFGs by substituting the architectural blocks for the selected VNFs that implement the architectural blocks.

10. The network node of claim 9, wherein the network node is further adapted to:
add information of service access points (SAPs), connection points (CPs) and virtual links (VLs) to edges of each pre-VNFFG.

11. The network node of claim 9, wherein the network access points, the connection points and the virtual links of the VNFFG belong to a same plane, which is one of a data plane, a control plane, and a management plane.

12. The network node of claim 8, wherein the architectural blocks specify interface information including one or more of: a protocol used on an interface, a role of the interface, a network plane, and a standard used by the interface.

13. The network node of claim 8, wherein the functionalities of the selected VNFs include requested functionalities specified in the network service requirements and groups of functionalities decomposed from the requested functionalities according to an ontology, wherein the ontology contains decompositions and dependencies of known functionalities and known architectural blocks that realize the known functionalities.

14. The network node of claim 8, wherein the network node includes a support system of a network service provider, the support system is further adapted to:
generate the NSD;
deliver the NSD to a Network Function Virtualization management and orchestration (NFV-MANO) as a deployment template for the network service; and
request the NFV-MANO to instantiate the network service according to the NSD.

* * * * *